US009269223B2

(12) United States Patent
Rowe

(10) Patent No.: US 9,269,223 B2
(45) Date of Patent: Feb. 23, 2016

(54) GAMING SYSTEM AND METHOD FOR PROVIDING PLAY OF LOCAL FIRST GAME AND REMOTE SECOND GAME

(71) Applicant: IGT, Las Vegas, NV (US)

(72) Inventor: Richard E. Rowe, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 14/850,583

(22) Filed: Sep. 10, 2015

(65) Prior Publication Data

US 2015/0379832 A1 Dec. 31, 2015

Related U.S. Application Data

(63) Continuation of application No. 11/925,314, filed on Oct. 26, 2007, now Pat. No. 9,142,097.

(51) Int. Cl.
*A63F 13/00* (2014.01)
*G07F 17/32* (2006.01)

(52) U.S. Cl.
CPC .................................. *G07F 17/3225* (2013.01)

(58) Field of Classification Search
CPC .. G07F 17/32; G07F 17/3225; G07F 17/3262
USPC ................................................ 463/20, 23, 25
See application file for complete search history.

(56) References Cited

U.S. PATENT DOCUMENTS

| | | | |
|---|---|---|---|
| 4,335,809 | A | 6/1982 | Wain |
| 4,572,509 | A | 2/1986 | Sitrick |
| 4,652,998 | A | 3/1987 | Koza et al. |
| 4,842,278 | A | 6/1989 | Markowicz |
| 4,856,787 | A | 8/1989 | Itkis |
| 4,866,515 | A | 9/1989 | Tagawa et al. |
| 4,924,378 | A | 5/1990 | Hershey et al. |
| 5,138,712 | A | 8/1992 | Corbin |
| 5,142,622 | A | 8/1992 | Owens |
| 5,178,395 | A | 1/1993 | Lovell |
| 5,179,517 | A | 1/1993 | Sarbin et al. |
| 5,276,312 | A | 1/1994 | McCarthy |

(Continued)

FOREIGN PATENT DOCUMENTS

| | | |
|---|---|---|
| AU | 738686 | 3/1999 |
| EP | 0 655 265 | 5/1995 |

(Continued)

OTHER PUBLICATIONS

Bally Live-Server Based Gaming brochure, written by Bally Gaming Systems, published in 2006.

(Continued)

*Primary Examiner* — Allen Chan
(74) *Attorney, Agent, or Firm* — Neal, Gerber & Eisenberg LLP

(57) ABSTRACT

A gaming system including a central server linked to a plurality of gaming devices. Upon the central server determining that a game transfer event has occurred, the central server selects a game played by a first player at a first gaming device to be displayed to a second player at a second, gaming device in the gaming system. The first player at the first gaming device and the second player at the second gaming device are provided any awards for the outcomes generated in association with the game currently played by the first player at the first gaming device.

25 Claims, 11 Drawing Sheets

(56) References Cited

U.S. PATENT DOCUMENTS 5,288,978 A 2/1994 Iijima
5,305,195 A 4/1994 Murphy
5,344,144 A 9/1994 Canon
5,349,642 A 9/1994 Kingdon
5,375,206 A 12/1994 Hunter et al.
5,377,993 A 1/1995 Josephs
5,393,057 A 2/1995 Marnell, II
5,404,567 A 4/1995 DePietro et al.
5,429,361 A 7/1995 Raven et al.
5,430,791 A 7/1995 Feit et al.
5,438,508 A 8/1995 Wyman
5,476,259 A 12/1995 Weingardt
5,499,340 A 3/1996 Barritz
5,507,491 A 4/1996 Gatto et al.
5,511,781 A 4/1996 Wood et al.
5,530,232 A 6/1996 Taylor
5,531,448 A 7/1996 Moody
5,559,313 A 9/1996 Claus et al.
5,560,603 A 10/1996 Seelig et al.
5,564,700 A 10/1996 Celona
5,566,337 A 10/1996 Szymanski et al.
5,578,808 A 11/1996 Taylor
5,586,257 A 12/1996 Perlman
5,586,937 A 12/1996 Menashe
5,617,331 A 4/1997 Wakai et al.
5,626,341 A 5/1997 Jones et al.
5,630,757 A 5/1997 Gagin et al.
5,640,192 A 6/1997 Garfinkle
5,643,086 A 7/1997 Alcorn et al.
5,649,118 A 7/1997 Carlisle et al.
5,655,603 A 8/1997 Schulte et al.
5,655,961 A 8/1997 Acres et al.
5,664,998 A 9/1997 Seelig et al.
5,671,412 A 9/1997 Christiano
5,702,304 A 12/1997 Acres et al.
5,708,709 A 1/1998 Rose
5,717,604 A 2/1998 Wiggins
5,732,950 A 3/1998 Moody
5,741,183 A 4/1998 Acres et al.
5,745,879 A 4/1998 Wyman
5,752,882 A 5/1998 Acres et al.
5,755,621 A 5/1998 Marks et al.
5,758,069 A 5/1998 Olsen
5,759,102 A 6/1998 Pease et al.
5,762,552 A 6/1998 Vuong et al.
5,766,076 A 6/1998 Pease et al.
5,768,382 A 6/1998 Schneier et al.
5,779,545 A 7/1998 Berg et al.
5,779,549 A 7/1998 Walker et al.
5,788,573 A 8/1998 Baerlocher et al.
5,800,268 A 9/1998 Molnick
5,806,855 A 9/1998 Cherry
5,820,459 A 10/1998 Acres et al.
5,823,873 A 10/1998 Moody
5,828,840 A 10/1998 Cowan et al.
5,833,540 A 11/1998 Miodunski et al.
5,836,817 A 11/1998 Acres et al.
5,845,283 A 12/1998 Williams et al.
5,851,011 A 12/1998 Loff
5,851,149 A 12/1998 Xidos et al.
5,855,515 A 1/1999 Pease et al.
5,871,398 A 2/1999 Schneier et al.
5,876,284 A 3/1999 Acres et al.
5,885,158 A 3/1999 Torango et al.
5,890,962 A 4/1999 Takemoto
5,903,732 A 5/1999 Reed et al.
5,905,248 A 5/1999 Russell et al.
5,913,164 A 6/1999 Pawa et al.
5,917,725 A 6/1999 Thacher et al.
5,918,039 A 6/1999 Buswell et al.
5,925,127 A 7/1999 Ahmad
5,941,773 A 8/1999 Harlick
5,947,820 A 9/1999 Morro et al.
5,947,822 A 9/1999 Weiss
5,951,397 A 9/1999 Dickinson
5,951,611 A 9/1999 La Pierre
5,971,271 A 10/1999 Wynn et al.
5,971,849 A 10/1999 Falciglia
5,974,409 A 10/1999 Sanu et al.
5,980,093 A 11/1999 Jones et al.
5,983,190 A 11/1999 Trower, II et al.
5,991,760 A 11/1999 Gauvin et al.
5,991,790 A 11/1999 Shah et al.
5,996,068 A 11/1999 Dwyer, III et al.
5,999,808 A 12/1999 La Due
6,001,016 A 12/1999 Walker et al.
6,003,066 A 12/1999 Ryan et al.
6,003,094 A 12/1999 Dean
6,003,123 A 12/1999 Carter et al.
6,011,850 A 1/2000 Bertrand et al.
6,024,640 A 2/2000 Walker et al.
6,068,552 A 5/2000 Walker et al.
6,068,982 A 5/2000 Rolfe et al.
6,071,190 A 6/2000 Weiss et al.
6,079,711 A 6/2000 Wei et al.
6,085,247 A 7/2000 Parsons, Jr. et al.
6,089,975 A 7/2000 Dunn
6,089,982 A 7/2000 Holch et al.
6,099,408 A 8/2000 Schneier et al.
6,106,396 A 8/2000 Alcorn et al.
6,108,420 A 8/2000 Larose et al.
6,110,041 A 8/2000 Walker et al.
6,113,098 A 9/2000 Adams
6,113,495 A 9/2000 Walker et al.
6,117,013 A 9/2000 Eiba
6,135,884 A 10/2000 Hendrick et al.
6,135,887 A 10/2000 Pease et al.
6,141,737 A 10/2000 Krantz et al.
6,142,872 A 11/2000 Walker et al.
6,149,522 A 11/2000 Alcorn et al.
6,151,707 A 11/2000 Hecksel et al.
6,159,095 A 12/2000 Frohm et al.
6,162,122 A 12/2000 Acres et al.
6,168,520 B1 1/2001 Baerlocher et al.
6,203,428 B1 3/2001 Giobbi et al.
6,206,782 B1 3/2001 Walker et al.
6,219,836 B1 4/2001 Wells et al.
6,224,486 B1 5/2001 Walker et al.
6,234,896 B1 5/2001 Walker et al.
6,241,608 B1 6/2001 Torango
6,251,014 B1 6/2001 Stockdale et al.
6,254,483 B1 7/2001 Acres
6,257,981 B1 7/2001 Acres et al.
6,264,561 B1 7/2001 Saffari et al.
6,287,200 B1 9/2001 Sharma
6,287,202 B1 9/2001 Pascal et al.
6,293,866 B1 9/2001 Walker et al.
6,304,905 B1 10/2001 Clark
6,308,271 B2 10/2001 Tanaka
6,312,332 B1 11/2001 Walker et al.
6,312,333 B1 11/2001 Acres
6,319,122 B1 11/2001 Packes, Jr. et al.
6,319,125 B1 11/2001 Acres
6,345,386 B1 2/2002 Delo et al.
6,353,928 B1 3/2002 Altberg et al.
6,354,946 B1 3/2002 Finn
6,358,150 B1 3/2002 Mir et al.
6,361,437 B1 3/2002 Walker et al.
6,361,441 B1 3/2002 Walker et al.
6,364,314 B1 4/2002 Canterbury
6,368,216 B1 4/2002 Hedrick et al.
6,383,074 B1 5/2002 Boggs
6,389,538 B1 5/2002 Gruse et al.
6,389,589 B1 5/2002 Mishra et al.
6,394,902 B1 5/2002 Glavich et al.
6,394,907 B1 5/2002 Rowe
6,397,381 B1 5/2002 Delo et al.
6,398,645 B1 6/2002 Yoseloff
6,402,614 B1 6/2002 Schneier et al.
6,409,602 B1 6/2002 Wiltshire et al.
6,418,554 B1 7/2002 Delo et al.
6,425,828 B2 7/2002 Walker et al.
6,427,227 B1 7/2002 Chamberlain
6,439,996 B2 8/2002 LeMay et al.

(56) References Cited

U.S. PATENT DOCUMENTS

| | | | |
|---|---|---|---|
| 6,442,529 | B1 | 8/2002 | Krishan et al. |
| 6,443,839 | B2 | 9/2002 | Stockdale et al. |
| 6,450,887 | B1 | 9/2002 | Mir et al. |
| 6,457,175 | B1 | 9/2002 | Lerche |
| RE37,885 | E | 10/2002 | Acres et al. |
| 6,488,585 | B1 | 12/2002 | Wells et al. |
| 6,503,146 | B2 | 1/2003 | Walker et al. |
| 6,506,118 | B1 | 1/2003 | Baerlocher et al. |
| 6,508,710 | B1 | 1/2003 | Paravia et al. |
| 6,511,068 | B1 | 1/2003 | Sklansky et al. |
| 6,523,166 | B1 | 2/2003 | Mishra et al. |
| 6,527,638 | B1 | 3/2003 | Walker et al. |
| 6,532,543 | B1 | 3/2003 | Smith et al. |
| 6,533,664 | B1 | 3/2003 | Crumby |
| 6,565,434 | B1 | 5/2003 | Acres |
| 6,575,832 | B1 | 6/2003 | Manfredi et al. |
| 6,578,199 | B1 | 6/2003 | Tsou et al. |
| 6,592,457 | B1 | 7/2003 | Frohm et al. |
| 6,595,856 | B1 | 7/2003 | Ginsburg et al. |
| 6,607,439 | B2 | 8/2003 | Schneier et al. |
| 6,609,978 | B1 | 8/2003 | Paulsen |
| 6,620,047 | B1 | 9/2003 | Alcorn et al. |
| 6,628,939 | B2 | 9/2003 | Paulsen |
| 6,638,170 | B1 | 10/2003 | Crumby |
| 6,645,077 | B2 | 11/2003 | Rowe |
| 6,648,758 | B2 | 11/2003 | Bennett et al. |
| 6,652,378 | B2 | 11/2003 | Cannon et al. |
| 6,656,040 | B1 | 12/2003 | Brosnan et al. |
| 6,656,044 | B1 | 12/2003 | Lewis |
| 6,682,423 | B2 | 1/2004 | Brosnan et al. |
| 6,685,567 | B2 | 2/2004 | Cockerille et al. |
| 6,695,696 | B1 | 2/2004 | Kaminkow |
| 6,712,699 | B2 | 3/2004 | Walker et al. |
| 6,712,702 | B2 | 3/2004 | Goldberg et al. |
| 6,722,986 | B1 | 4/2004 | Lyons et al. |
| 6,733,390 | B2 | 5/2004 | Walker et al. |
| 6,746,327 | B2 | 6/2004 | Frohm et al. |
| 6,749,510 | B2 | 6/2004 | Giobbi |
| 6,780,111 | B2 | 8/2004 | Cannon et al. |
| 6,782,477 | B2 | 8/2004 | McCarroll |
| 6,786,819 | B2 | 9/2004 | Baerlocher et al. |
| 6,790,142 | B2 | 9/2004 | Okada et al. |
| 6,790,143 | B2 | 9/2004 | Crumby |
| 6,802,778 | B1 | 10/2004 | LeMay et al. |
| 6,804,763 | B1 | 10/2004 | Stockdale et al. |
| 6,805,634 | B1 | 10/2004 | Wells et al. |
| 6,811,488 | B2 | 11/2004 | Paravia et al. |
| 6,813,765 | B1 | 11/2004 | Flores |
| 6,816,882 | B1 | 11/2004 | Conner et al. |
| 6,823,456 | B1 | 11/2004 | Dan et al. |
| 6,830,515 | B2 | 12/2004 | Rowe |
| 6,832,958 | B2 | 12/2004 | Acres et al. |
| 6,834,245 | B2 | 12/2004 | Ota et al. |
| 6,836,794 | B1 | 12/2004 | Lucovsky et al. |
| 6,837,793 | B2 | 1/2005 | McClintic |
| 6,843,723 | B2 | 1/2005 | Joshi |
| 6,843,725 | B2 | 1/2005 | Nelson |
| 6,846,238 | B2 | 1/2005 | Wells |
| 6,852,031 | B1 | 2/2005 | Rowe |
| 6,855,054 | B2 | 2/2005 | White et al. |
| 6,855,057 | B2 | 2/2005 | Namba et al. |
| 6,857,959 | B1 | 2/2005 | Nguyen |
| 6,860,810 | B2 | 3/2005 | Cannon et al. |
| 6,863,608 | B1 | 3/2005 | LeMay et al. |
| 6,866,581 | B2 | 3/2005 | Martinek et al. |
| 6,866,584 | B2 | 3/2005 | Michaelson |
| 6,866,586 | B2 | 3/2005 | Oberberger et al. |
| 6,875,109 | B2 | 4/2005 | Stockdale |
| 6,875,110 | B1 | 4/2005 | Crumby |
| 6,878,063 | B2 | 4/2005 | Manfredi et al. |
| 6,884,162 | B2 | 4/2005 | Raverdy et al. |
| 6,884,166 | B2 | 4/2005 | Leen et al. |
| 6,884,170 | B2 | 4/2005 | Rowe |
| 6,884,171 | B2 | 4/2005 | Eck et al. |
| 6,884,173 | B2 | 4/2005 | Gauselmann |
| 6,884,174 | B2 | 4/2005 | Lundy et al. |
| 6,887,151 | B2 | 5/2005 | Leen et al. |
| 6,887,156 | B2 | 5/2005 | DeWeese et al. |
| 6,889,159 | B2 | 5/2005 | Klotz et al. |
| 6,890,256 | B2 | 5/2005 | Walker et al. |
| 6,896,616 | B2 | 5/2005 | Weiss |
| 6,896,618 | B2 | 5/2005 | Benoy et al. |
| 6,899,627 | B2 | 5/2005 | Lam et al. |
| 6,899,628 | B2 | 5/2005 | Leen et al. |
| 6,901,375 | B2 | 5/2005 | Fernandez |
| 6,902,478 | B2 | 6/2005 | McClintic |
| 6,902,481 | B2 | 6/2005 | Breckner et al. |
| 6,908,390 | B2 | 6/2005 | Nguyen et al. |
| 6,908,391 | B2 | 6/2005 | Gatto et al. |
| 6,910,965 | B2 | 6/2005 | Downes |
| 6,939,226 | B1 | 9/2005 | Joshi |
| 6,939,234 | B2 | 9/2005 | Beatty |
| 6,942,571 | B1 | 9/2005 | McAllister et al. |
| 6,945,870 | B2 | 9/2005 | Gatto et al. |
| 6,960,136 | B2 | 11/2005 | Joshi et al. |
| 6,991,544 | B2 | 1/2006 | Soltys et al. |
| 7,051,004 | B2 | 5/2006 | Nuttall et al. |
| 7,066,815 | B2 | 6/2006 | Walker et al. |
| 7,156,741 | B2 | 1/2007 | Hornik et al. |
| 2001/0036857 | A1 | 11/2001 | Mothwurf et al. |
| 2001/0044337 | A1 | 11/2001 | Rowe et al. |
| 2001/0046893 | A1 | 11/2001 | Giobbi et al. |
| 2001/0055990 | A1 | 12/2001 | Acres |
| 2002/0032049 | A1 | 3/2002 | Walker et al. |
| 2002/0045474 | A1 | 4/2002 | Singer et al. |
| 2002/0045484 | A1 | 4/2002 | Eck et al. |
| 2002/0057800 | A1 | 5/2002 | Gordon et al. |
| 2002/0058546 | A2 | 5/2002 | Acres |
| 2002/0068629 | A1 | 6/2002 | Allen et al. |
| 2002/0068631 | A1 | 6/2002 | Raverdy et al. |
| 2002/0071557 | A1 | 6/2002 | Nguyen |
| 2002/0071560 | A1 | 6/2002 | Kurn et al. |
| 2002/0080969 | A1 | 6/2002 | Giobbi |
| 2002/0111209 | A1 | 8/2002 | Walker et al. |
| 2002/0116615 | A1 | 8/2002 | Nguyen et al. |
| 2002/0137217 | A1 | 9/2002 | Rowe |
| 2002/0138594 | A1 | 9/2002 | Rowe |
| 2002/0144116 | A1 | 10/2002 | Giobbi |
| 2002/0151360 | A1 | 10/2002 | Durham et al. |
| 2002/0151363 | A1 | 10/2002 | Letovsky et al. |
| 2002/0160826 | A1 | 10/2002 | Gomez et al. |
| 2002/0169022 | A1 | 11/2002 | Canterbury |
| 2002/0173355 | A1 | 11/2002 | Walker et al. |
| 2002/0174160 | A1 | 11/2002 | Gatto et al. |
| 2002/0174444 | A1 | 11/2002 | Gatto et al. |
| 2002/0177483 | A1 | 11/2002 | Cannon |
| 2002/0183105 | A1 | 12/2002 | Cannon et al. |
| 2002/0188940 | A1 | 12/2002 | Breckner et al. |
| 2003/0027638 | A1 | 2/2003 | Schneider et al. |
| 2003/0036430 | A1 | 2/2003 | Cannon |
| 2003/0045351 | A1 | 3/2003 | Gauselmann |
| 2003/0045354 | A1 | 3/2003 | Giobbi |
| 2003/0054879 | A1 | 3/2003 | Schneier et al. |
| 2003/0060268 | A1 | 3/2003 | Falconer |
| 2003/0060286 | A1 | 3/2003 | Walker et al. |
| 2003/0064771 | A1 | 4/2003 | Morrow et al. |
| 2003/0064807 | A1 | 4/2003 | Walker et al. |
| 2003/0069058 | A1 | 4/2003 | Byrne et al. |
| 2003/0073497 | A1 | 4/2003 | Nelson |
| 2003/0078093 | A1 | 4/2003 | Simms et al. |
| 2003/0078094 | A1 | 4/2003 | Gatto et al. |
| 2003/0078101 | A1 | 4/2003 | Schneider et al. |
| 2003/0092489 | A1 | 5/2003 | Veradej |
| 2003/0093669 | A1 | 5/2003 | Morais et al. |
| 2003/0100359 | A1 | 5/2003 | Loose et al. |
| 2003/0100369 | A1 | 5/2003 | Gatto et al. |
| 2003/0100370 | A1 | 5/2003 | Gatto et al. |
| 2003/0100371 | A1 | 5/2003 | Gatto et al. |
| 2003/0100372 | A1 | 5/2003 | Gatto et al. |
| 2003/0104865 | A1 | 6/2003 | Itkis et al. |
| 2003/0114218 | A1 | 6/2003 | McClintic |
| 2003/0114219 | A1 | 6/2003 | McClintic |
| 2003/0115351 | A1 | 6/2003 | Giobbi |
| 2003/0125107 | A1 | 7/2003 | Cannon |

(56) References Cited

U.S. PATENT DOCUMENTS

| | | | |
|---|---|---|---|
| 2003/0139214 | A1 | 7/2003 | Wolf et al. |
| 2003/0140134 | A1 | 7/2003 | Swanson et al. |
| 2003/0162583 | A1 | 8/2003 | Baerlocher et al. |
| 2003/0162589 | A1 | 8/2003 | Nguyen et al. |
| 2003/0171149 | A1 | 9/2003 | Rothschild |
| 2003/0176219 | A1 | 9/2003 | Manfredi et al. |
| 2003/0181231 | A1 | 9/2003 | Vancura et al. |
| 2003/0186745 | A1 | 10/2003 | Nguyen et al. |
| 2003/0188306 | A1 | 10/2003 | Harris et al. |
| 2003/0190941 | A1 | 10/2003 | Byrne |
| 2003/0195033 | A1 | 10/2003 | Gazdic et al. |
| 2003/0216182 | A1 | 11/2003 | Gauselmann |
| 2003/0224852 | A1 | 12/2003 | Walker et al. |
| 2003/0228904 | A1 | 12/2003 | Acres et al. |
| 2003/0228907 | A1 | 12/2003 | Gatto et al. |
| 2003/0228912 | A1 | 12/2003 | Wells et al. |
| 2003/0232650 | A1 | 12/2003 | Beatty |
| 2004/0002381 | A1 | 1/2004 | Alcorn et al. |
| 2004/0002385 | A1 | 1/2004 | Nguyen |
| 2004/0003389 | A1 | 1/2004 | Reynar et al. |
| 2004/0005919 | A1 | 1/2004 | Walker et al. |
| 2004/0010700 | A1 | 1/2004 | Mont |
| 2004/0015423 | A1 | 1/2004 | Walker et al. |
| 2004/0023721 | A1 | 2/2004 | Giobbi |
| 2004/0024666 | A1 | 2/2004 | Walker et al. |
| 2004/0029635 | A1 | 2/2004 | Giobbi |
| 2004/0038723 | A1 | 2/2004 | Schneier et al. |
| 2004/0048660 | A1 | 3/2004 | Gentles et al. |
| 2004/0048667 | A1 | 3/2004 | Rowe |
| 2004/0053664 | A1 | 3/2004 | Byrne |
| 2004/0054952 | A1 | 3/2004 | Morrow et al. |
| 2004/0063489 | A1 | 4/2004 | Crumby |
| 2004/0072604 | A1 | 4/2004 | Toyoda |
| 2004/0072608 | A1 | 4/2004 | Toyoda |
| 2004/0072619 | A1 | 4/2004 | Brosnan et al. |
| 2004/0082385 | A1 | 4/2004 | Silva et al. |
| 2004/0092310 | A1 | 5/2004 | Brosnan et al. |
| 2004/0098597 | A1 | 5/2004 | Giobbi |
| 2004/0106446 | A1 | 6/2004 | Cannon et al. |
| 2004/0106452 | A1 | 6/2004 | Nguyen et al. |
| 2004/0124243 | A1 | 7/2004 | Gatto et al. |
| 2004/0127279 | A1 | 7/2004 | Gatto et al. |
| 2004/0132532 | A1 | 7/2004 | Brosnan et al. |
| 2004/0133485 | A1 | 7/2004 | Schoonmaker et al. |
| 2004/0142739 | A1 | 7/2004 | Loose et al. |
| 2004/0142742 | A1 | 7/2004 | Schneider et al. |
| 2004/0152509 | A1 | 8/2004 | Hornik et al. |
| 2004/0162144 | A1 | 8/2004 | Loose et al. |
| 2004/0166923 | A1 | 8/2004 | Michaelson et al. |
| 2004/0166940 | A1 | 8/2004 | Rothschild |
| 2004/0166942 | A1 | 8/2004 | Muir |
| 2004/0176162 | A1 | 9/2004 | Rothschild |
| 2004/0176167 | A1 | 9/2004 | Michaelson et al. |
| 2004/0179701 | A1 | 9/2004 | Boyd |
| 2004/0180721 | A1 | 9/2004 | Rowe |
| 2004/0180722 | A1 | 9/2004 | Giobbi |
| 2004/0185936 | A1 | 9/2004 | Block et al. |
| 2004/0193726 | A1 | 9/2004 | Gatto et al. |
| 2004/0198494 | A1 | 10/2004 | Nguyen et al. |
| 2004/0198496 | A1 | 10/2004 | Gatto et al. |
| 2004/0204232 | A1 | 10/2004 | Asher et al. |
| 2004/0204244 | A1 | 10/2004 | Rathsack et al. |
| 2004/0214622 | A1 | 10/2004 | Atkinson |
| 2004/0214627 | A1 | 10/2004 | Jordan et al. |
| 2004/0214640 | A1 | 10/2004 | Giobbi |
| 2004/0214641 | A1 | 10/2004 | Giobbi |
| 2004/0215756 | A1 | 10/2004 | VanAntwerp et al. |
| 2004/0219967 | A1 | 11/2004 | Giobbi et al. |
| 2004/0219983 | A1 | 11/2004 | Giobbi |
| 2004/0224770 | A1 | 11/2004 | Wolf et al. |
| 2004/0229684 | A1 | 11/2004 | Blackburn et al. |
| 2004/0229698 | A1 | 11/2004 | Lind et al. |
| 2004/0229699 | A1 | 11/2004 | Gentles et al. |
| 2004/0235559 | A1 | 11/2004 | Brosnan et al. |
| 2004/0235563 | A1 | 11/2004 | Blackburn et al. |
| 2004/0242298 | A1 | 12/2004 | Inamura et al. |
| 2004/0242303 | A1 | 12/2004 | Walker et al. |
| 2004/0242328 | A1 | 12/2004 | Blackburn et al. |
| 2004/0242329 | A1 | 12/2004 | Blackburn et al. |
| 2004/0242330 | A1 | 12/2004 | Blackburn et al. |
| 2004/0242331 | A1 | 12/2004 | Blackburn et al. |
| 2004/0243848 | A1 | 12/2004 | Blackburn et al. |
| 2004/0243849 | A1 | 12/2004 | Blackburn et al. |
| 2004/0248642 | A1 | 12/2004 | Rothschild |
| 2004/0248645 | A1 | 12/2004 | Blackburn et al. |
| 2004/0248646 | A1 | 12/2004 | Canterbury |
| 2004/0248651 | A1 | 12/2004 | Gagner |
| 2004/0254006 | A1 | 12/2004 | Lam et al. |
| 2004/0254013 | A1 | 12/2004 | Quraishi et al. |
| 2004/0254014 | A1 | 12/2004 | Quraishi et al. |
| 2004/0254954 | A1 | 12/2004 | Gatto et al. |
| 2004/0255139 | A1 | 12/2004 | Giobbi |
| 2004/0259629 | A1 | 12/2004 | Michaelson et al. |
| 2004/0259633 | A1 | 12/2004 | Gentles et al. |
| 2004/0259640 | A1 | 12/2004 | Gentles et al. |
| 2004/0259643 | A1 | 12/2004 | Gentles |
| 2004/0266532 | A1 | 12/2004 | Blackburn et al. |
| 2004/0266533 | A1 | 12/2004 | Gentles et al. |
| 2005/0003886 | A1 | 1/2005 | Englman et al. |
| 2005/0009599 | A1 | 1/2005 | Ryan |
| 2005/0009601 | A1 | 1/2005 | Manfredi et al. |
| 2005/0009607 | A1 | 1/2005 | Russell et al. |
| 2005/0010738 | A1 | 1/2005 | Stockdale et al. |
| 2005/0014559 | A1 | 1/2005 | Mattice et al. |
| 2005/0032566 | A1 | 2/2005 | Baerlocher et al. |
| 2005/0032573 | A1 | 2/2005 | Acres et al. |
| 2005/0032577 | A1 | 2/2005 | Blackburn et al. |
| 2005/0037708 | A1 | 2/2005 | Torvinen |
| 2005/0043072 | A1 | 2/2005 | Nelson |
| 2005/0043088 | A1 | 2/2005 | Nguyen et al. |
| 2005/0043090 | A1 | 2/2005 | Pryzby et al. |
| 2005/0043094 | A1 | 2/2005 | Nguyen et al. |
| 2005/0044535 | A1 | 2/2005 | Coppert |
| 2005/0049037 | A1 | 3/2005 | Anderson et al. |
| 2005/0054431 | A1 | 3/2005 | Walker et al. |
| 2005/0054438 | A1 | 3/2005 | Rothschild et al. |
| 2005/0054445 | A1 | 3/2005 | Gatto et al. |
| 2005/0054447 | A1 | 3/2005 | Hiroyama et al. |
| 2005/0054448 | A1 | 3/2005 | Frerking et al. |
| 2005/0059457 | A1 | 3/2005 | Rothschild et al. |
| 2005/0059493 | A1 | 3/2005 | Tyson et al. |
| 2005/0059494 | A1 | 3/2005 | Kammler |
| 2005/0064939 | A1 | 3/2005 | McSheffrey et al. |
| 2005/0075983 | A1 | 4/2005 | St. Denis |
| 2005/0081623 | A1 | 4/2005 | Frank |
| 2005/0086286 | A1 | 4/2005 | Gatto et al. |
| 2005/0090313 | A1 | 4/2005 | Rowe |
| 2005/0096114 | A1 | 5/2005 | Cannon et al. |
| 2005/0096133 | A1 | 5/2005 | Hoefelmeyer et al. |
| 2005/0097342 | A1 | 5/2005 | Gatto et al. |
| 2005/0101370 | A1 | 5/2005 | Lind et al. |
| 2005/0107164 | A1 | 5/2005 | Muir et al. |
| 2005/0113172 | A1 | 5/2005 | Gong |
| 2005/0114272 | A1 | 5/2005 | Herrmann et al. |
| 2005/0119045 | A1 | 6/2005 | Fujimoto |
| 2005/0119046 | A1 | 6/2005 | Fujimoto |
| 2005/0137012 | A1 | 6/2005 | Michaelson |
| 2005/0148385 | A1 | 7/2005 | Michaelson |
| 2005/0181860 | A1 | 8/2005 | Nguyen et al. |
| 2005/0193209 | A1 | 9/2005 | Saunders et al. |
| 2005/0221882 | A1 | 10/2005 | Nguyen et al. |
| 2005/0233794 | A1 | 10/2005 | Cannon et al. |
| 2005/0261060 | A1 | 11/2005 | Nguyen et al. |
| 2005/0261061 | A1 | 11/2005 | Nguyen et al. |
| 2005/0282629 | A1 | 12/2005 | Gagner |
| 2005/0282638 | A1 | 12/2005 | Rowe |
| 2006/0009273 | A2 | 1/2006 | Moshal |
| 2006/0019747 | A1 | 1/2006 | Loose et al. |
| 2006/0019750 | A1 | 1/2006 | Beatty |
| 2006/0025209 | A1 | 2/2006 | Walker et al. |
| 2006/0030409 | A1 | 2/2006 | Lechner et al. |
| 2006/0031829 | A1 | 2/2006 | Harris et al. |
| 2006/0036573 | A1 | 2/2006 | Watanabe et al. |
| 2006/0039132 | A1 | 2/2006 | Chen |

(56) References Cited

U.S. PATENT DOCUMENTS

| | | | |
|---|---|---|---|
| 2006/0040735 | A1 | 2/2006 | Baerlocher |
| 2006/0068875 | A1 | 3/2006 | Cregan et al. |
| 2006/0073887 | A1 | 4/2006 | Nguyen et al. |
| 2006/0084486 | A1 | 4/2006 | Belger et al. |
| 2006/0084502 | A1 | 4/2006 | Downs, III et al. |
| 2006/0089194 | A1 | 4/2006 | Joshi et al. |
| 2006/0094508 | A1 | 5/2006 | D'Amico et al. |
| 2006/0111170 | A1 | 5/2006 | Hornik et al. |
| 2006/0121972 | A1 | 6/2006 | Walker et al. |
| 2006/0128460 | A1 | 6/2006 | Muir et al. |
| 2006/0135255 | A1 | 6/2006 | Roth |
| 2006/0194633 | A1 | 8/2006 | Paulsen |
| 2006/0211479 | A1 | 9/2006 | Walker et al. |
| 2006/0211480 | A1 | 9/2006 | Walker et al. |
| 2006/0217170 | A1 | 9/2006 | Roireau |
| 2006/0217171 | A1 | 9/2006 | Roireau |
| 2006/0217172 | A1 | 9/2006 | Roireau |
| 2006/0217176 | A1 | 9/2006 | Walker et al. |
| 2006/0223613 | A1 | 10/2006 | Walker et al. |
| 2006/0223636 | A1 | 10/2006 | Walker et al. |
| 2006/0240887 | A1 | 10/2006 | Walker et al. |
| 2006/0240889 | A1 | 10/2006 | Walker et al. |
| 2006/0240892 | A1 | 10/2006 | Walker et al. |
| 2006/0246983 | A1 | 11/2006 | Huard et al. |
| 2006/0247012 | A1 | 11/2006 | Walker et al. |
| 2006/0252523 | A1 | 11/2006 | Walker et al. |
| 2006/0258446 | A1 | 11/2006 | Nguyen et al. |
| 2006/0287107 | A1 | 12/2006 | Okada |
| 2007/0004509 | A1 | 1/2007 | Banton |
| 2007/0135215 | A1 | 6/2007 | Walker et al. |
| 2007/0232397 | A1 | 10/2007 | Katz |

FOREIGN PATENT DOCUMENTS

| | | |
|---|---|---|
| EP | 0843272 | 5/1998 |
| EP | 1004970 | 5/2000 |
| EP | 1199690 | 2/2004 |
| EP | 0813132 | 1/2005 |
| EP | 1378873 | 3/2005 |
| EP | 1238688 | 5/2005 |
| EP | 1378874 | 5/2005 |
| EP | 1471710 | 5/2005 |
| EP | 1291048 | 6/2005 |
| EP | 1 610 275 | 12/2005 |
| WO | WO 9727570 | 7/1997 |
| WO | WO 9835309 | 8/1998 |
| WO | WO 98/56475 | 12/1998 |
| WO | WO 9910849 | 3/1999 |
| WO | WO 9941718 | 8/1999 |
| WO | WO 9965579 | 12/1999 |
| WO | WO 0025281 | 5/2000 |
| WO | WO 00/32286 | 6/2000 |
| WO | WO 0161437 | 8/2001 |
| WO | WO 0222225 | 3/2002 |
| WO | WO 02099760 | 12/2002 |
| WO | WO 03/028830 | 4/2003 |
| WO | WO 03/041825 | 5/2003 |
| WO | WO 03045515 | 6/2003 |
| WO | WO 03045516 | 6/2003 |
| WO | WO 2004004855 | 1/2004 |
| WO | WO 2004103495 | 12/2004 |
| WO | WO 2005028056 | 3/2005 |
| WO | WO 2005029220 | 3/2005 |
| WO | WO 2005033825 | 4/2005 |
| WO | WO 2005033826 | 4/2005 |
| WO | WO 2005120672 | 12/2005 |
| WO | WO 2006027677 | 3/2006 |
| WO | WO 2006039067 | 4/2006 |
| WO | WO 2007103054 | 9/2007 |

OTHER PUBLICATIONS

Bonusing Solutions without Limits brochure, written by Bally Gaming Systems, published in 2005.

SB Products—The Next Big Innovation, printed from www.igt.com in Aug. 2006.

Server Based: Other Possibilities Article; published by www.casinocenter.com in May 2006.

Transferring Gaming brochure, written by Cyberview Technology, published in 2006.

GAMING SYSTEM AND METHOD FOR PROVIDING PLAY OF LOCAL FIRST GAME AND REMOTE SECOND GAME

PRIORITY CLAIM

This application is a continuation of, claims priority to and the benefit of U.S. patent application Ser. No. 11/925,314, filed on Oct. 26, 2007, the entire contents of which is incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain of these secondary or bonus games include a group gaming aspect. In these secondary or bonus games, a plurality of players at multiple gaming machines participate in a group event for one or more bonus awards. These bonus awards are sometimes displayed on a single display for multiple gaming machines. In certain of these group bonus games, a plurality of players compete for one or more bonus awards. In certain other of these group bonus games, a plurality of players play as a group or team to win such bonus awards.

As hundred of different gaming devices are released each year and many of these gaming device includes more than one type of game, it is difficult for players to have an opportunity to play all of these gaming devices and all of these games. Accordingly, a need exists for enabling certain players to become familiar with the games provided by these gaming devices without requiring the player to visit each of these gaming devices individually.

There is a continuing need to provide new and different gaming machines and gaming systems as well as new and different ways to provide awards to players including bonus awards.

SUMMARY

In one embodiment, the gaming system and method disclosed herein provides that upon an occurrence of a game transfer event, a first gaming device displays the play of one or more remotely played games associated with a second, different gaming device in the gaming system. In one embodiment, a first gaming device provides a bonus award opportunity to a player in the form of displaying to the player at the first gaming device at least one play of a game (referred to herein as the "supplemental game") associated with a second, different gaming device which is located remotely from the first gaming device. That is, if a game played at one gaming device in the gaming system is selected to function as a supplemental game, part or all of the play of that game is replicated and displayed at another, independent gaming device in the gaming system. In this embodiment, the first gaming device provides the player at the first gaming device any award associated with any generated outcome in the play of the supplemental game and the second gaming device provides the player at the second gaming device any award associated with any generated outcome in the play of the game selected to function as the supplemental game. Thus, the first gaming device displays the supplemental game such that the player at the first gaming device perceives to transport to at least one game played at a second gaming device in the gaming system. Such a configuration provides that a player's currently played gaming device is operable to locally display and provide any awards associated with any suitable remotely played game at any suitable remotely operated gaming device in the gaming system without requiring the player to relocate to such remote gaming devices.

In one embodiment, the gaming system is configured to cause the first gaming device to display as the supplemental game a game currently played at a second gaming device, a game simultaneously played at a second gaming device or a game substantially simultaneously played at a second gaming device. In another embodiment, the gaming system is configured to cause the first gaming device to display a game previously played within a designated time period at a second gaming device as the supplemental game. In another embodiment, the gaming system is configured to cause the first gaming device to display a game available at, but not currently being played at another gaming device in the gaming system as the supplemental game. In another embodiment, the types of games available to be played as the supplemental game changes based on which games are available to be played at the players current gaming device, which games are available to be played at other gaming devices in the gaming system (such as which games are available at the gaming establishment or a subset of which games are available at the gaming establishment) and/or which games are available to be communicated from a central server or remote host to at least one gaming device in the gaming system. It should be appreciated that such a configuration enables players to become familiar with new games and/or games which the player has not previously played without requiring the player to visit each of these different gaming devices individually.

In one embodiment, the gaming system disclosed herein includes a central server, central controller or remote host in communication with or linked to a plurality of gaming machines or gaming devices. The central server tracks or monitors the status of games played or other suitable events occurring in association with the gaming devices in the gaming system such that upon the occurrence of a game transfer event associated with one gaming device (referred to herein as the "triggering gaming device" or "triggering gaming apparatus"), the central server is operable to cause the triggering gaming device to display as a supplemental game the game played by another player at another, remotely located gaming device in the gaming system (referred to herein as the "supplemental gaming device" or "supplemental gaming apparatus"). In one embodiment, the gaming system enables the first player at the triggering gaming device to view or observe the second player's play of the game designated as the supplemental game wherein any award provided to the second player at the supplemental gaming device is also provided to the first player at the triggering gaming device. It should be appreciated that the gaming system disclosed herein provides that while a game displayed to a first player may function as a supplemental game for that first player, the same game may simultaneously function as a non supplemental game to a second player actively playing that game. Accordingly, one or more plays or one or more games may be concurrently characterized as both a supplemental game for one player and as a non-supplemental game for another player.

In operation of one embodiment, the central server determines if a game transfer event occurs in association with any gaming device in the gaming system. In one embodiment, a game transfer event occurs based on the generation of a symbol or symbol combination in a play of a primary game. In another embodiment, a game transfer event occurs independent of any event in or associated with any play of any primary game or secondary game. In different embodiments, the occurrence of a game transfer event is predetermined, randomly determined, determined based on the player's status (such as determined through a player tracking system), determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In one embodiment, if a game transfer event is determined to occur in association with a gaming device in the gaming system (i.e., the triggering gaming device), the central server determines which one or more of the games played at the different gaming devices in the gaming system to select as a supplemental game. In one embodiment, the central server monitors the status of each game played at each gaming device in the gaming system and utilizes this data or information to determine which game(s) played independent from the triggering gaming device to display and provide as a supplemental game. In one such embodiment, the central server selects which game to display and provide as a supplemental game based on one or more parameters or characteristics of the monitored game, such as the average expected payout of each remotely played game in the gaming system. In this embodiment, which game is selected as a supplemental game is determined based on matching one or more characteristics or parameters, such as wager level, denomination, number of lines played, gaming device manufacturer and/or average expected return, of the monitored game and the game at the triggering gaming device. In another embodiment, if a game transfer event is determined to occur, the central server provides the player at the triggering gaming device the option to observe a play of a supplemental game. In this embodiment, if the player accepts to view or observe the play of the supplemental game, the central server proceeds in selecting a supplemental game. In different embodiments, the selection of which game played independent from the triggering gaming device to display and provide as a supplemental game is determined based on a type of gaming device, determined based on a game theme, predetermined, randomly determined, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In another embodiment, if a game transfer event is determined to occur, the central server determines which game played at a gaming device in the gaming system to select as a supplemental game based on a player's player tracking status, such as determined through a player tracking system. In this embodiment, if a first player of a designated player tracking status is playing a first gaming device and a game transfer event occurs in association with that player or that player's currently played gaming device, the central server selects a game played by a second player of the same designated player tracking status to function as the supplemental game. In another embodiment, the gaming system enables a player to input one or more player preferences, such as a list of other players or game types. In this embodiment, if a player is playing a gaming device and a game transfer event occurs in association with that player or that players currently played gaming device, the central server selects a game played by one of the players or the game type on the player's inputted list to function as the supplemental game.

In one embodiment, after determining which game at which gaming device in the gaming system will function as the supplemental game, the central server causes the determined supplemental game to be displayed or replicated at the triggering gaming device. In this embodiment, based on the outcome of the displayed supplemental game, a supplemental or bonus award is determined and provided to the player at the triggering gaming device. That is, the central server is operable to provide that a game played at a gaming device in the gaming system is simultaneously, sequentially or in an overlapping manner associated with one or more different gaming devices in the gaming system wherein any awards provided at such gaming devices are based, at least in part, on the results of that game.

In one such embodiment, the triggering gaming device displays the supplemental game to the player and provides the player any award associated with any determined game outcome in the supplemental game as a supplemental or bonus award. In one such embodiment, the supplemental or bonus award is the same award as the player playing the supplemental game is provided. In another such embodiment, the supplemental or bonus award is based on a wager comparison. In this embodiment, the player at the triggering gaming device passively observes the supplemental game being played by a different player at the supplemental gaming device and is provided an award based on this play. In another such embodiment, the player at the triggering gaming device is enabled to interact with or actively participate in one or more aspects of the supplemental game, such as making one or more choices or selections in the play of the supplemental game. In this embodiment, based at least on this player's interactions in the play of the supplemental game, the player at the triggering gaming device is provided an award for the play of the supplemental game as a supplemental or bonus award. In another such embodiment, the player at the triggering gaming device is enabled to place a supplemental or side wager on the supplemental game, wherein any award provided in association with the supplemental game is based, at least in part, on the amount of the supplemental wager.

Accordingly, an advantage of the gaming system and method disclosed herein is to provide a gaming system and method having a plurality of gaming devices wherein one or more games may be concurrently played on one or more gaming devices in the gaming system. By implementing a central server, central controller or remote host to monitor the occurrences at the games played at the gaming devices in the gaming system, the gaming system and method disclosed herein provides that, upon a game transfer event, a plurality of players are provided awards based on one or more determinations occurring in association with a single game. Such a gaming system and method provides increased excitement and enjoyment to players because a plurality of players simultaneously experience the play of a single game.

Additional features and advantages are described in, and will be apparent from, the following Detailed Description and the figures.

DETAILED DESCRIPTION

The present disclosure may be implemented in various configurations for gaming machines, gaming devices or gaming apparatus, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
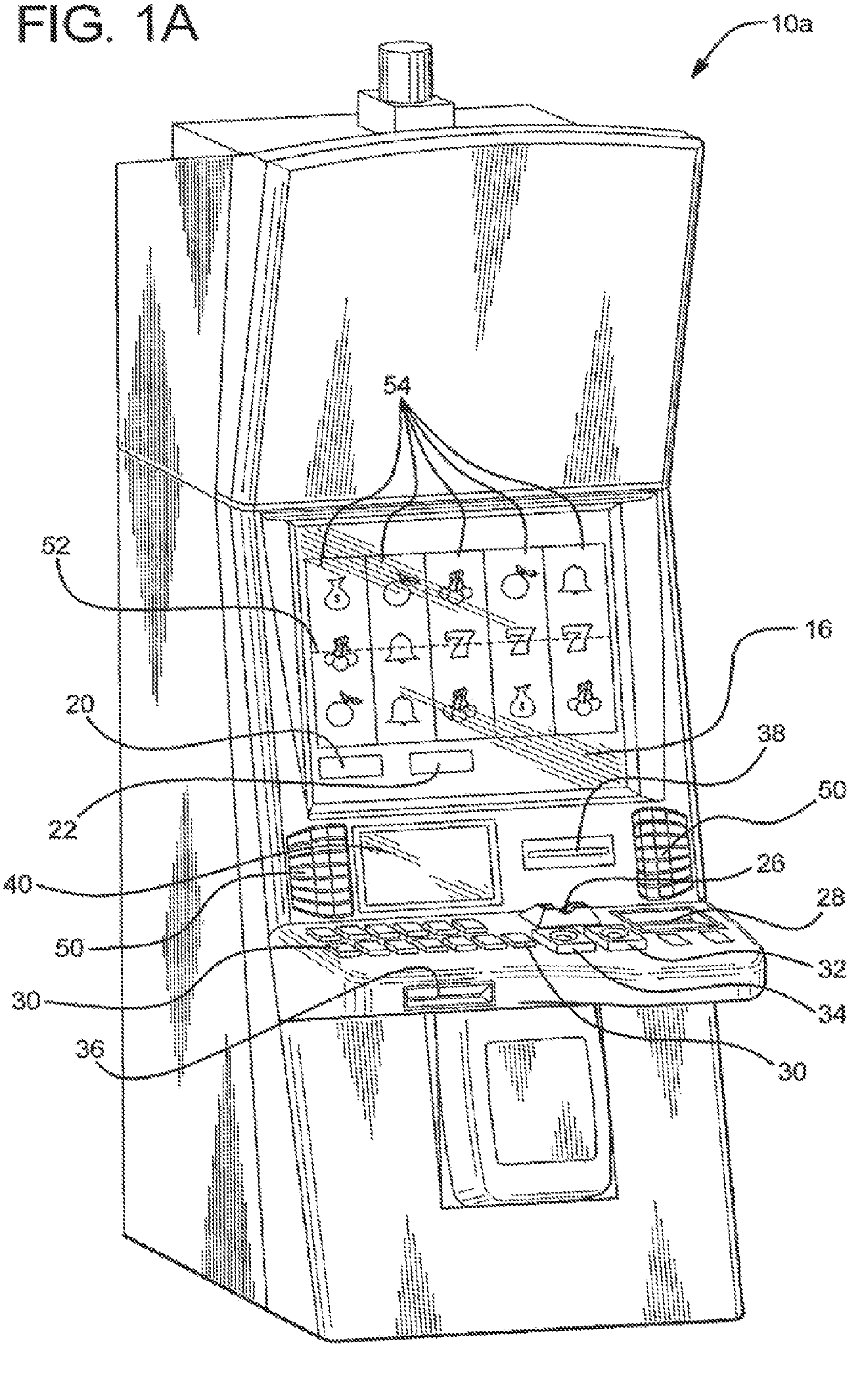
FIG. 1A is a front-side perspective view of one embodiment of the gaming device disclosed herein.
Figure 1B:
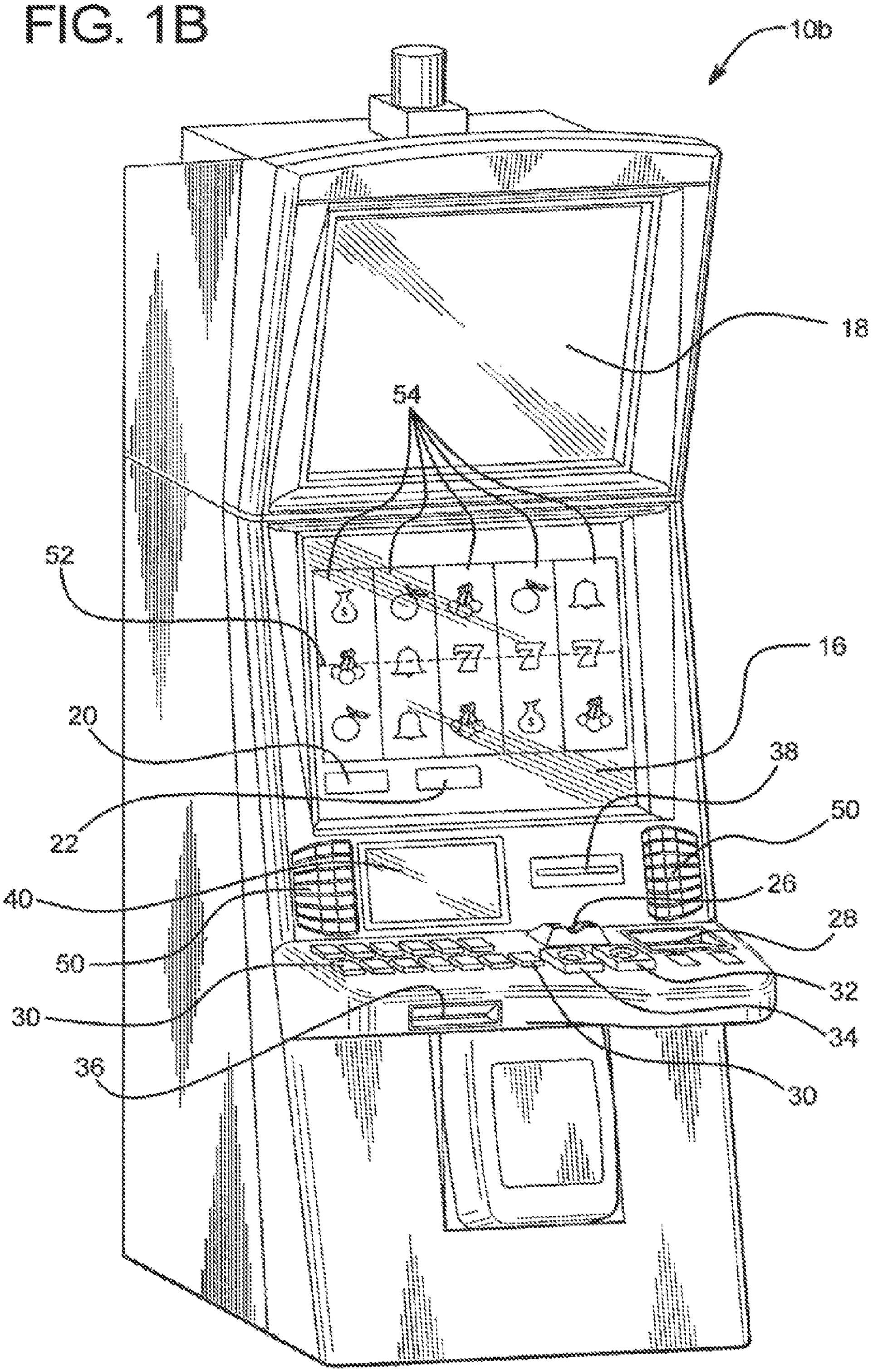
FIG. 1B is a front-side perspective view of another embodiment of the gaming device disclosed herein.

Referring now to the drawings, two example alternative embodiments of the gaming device, gaming machine or gaming apparatus disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2:
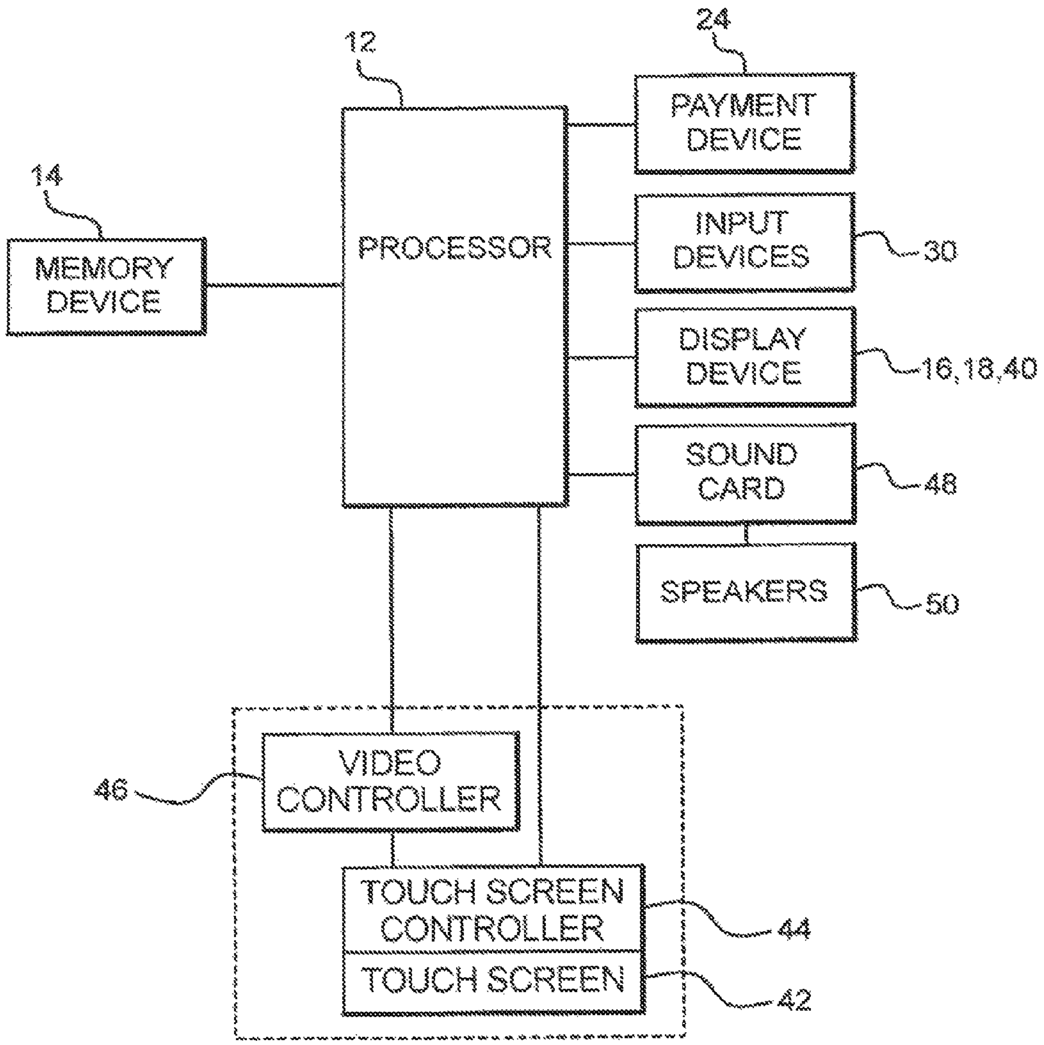
FIG. 2 is a schematic block diagram of the electronic configuration of one embodiment of the gaming device disclosed herein.

In one embodiment, as illustrated in FIG. 2, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM).

In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller,"

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor or a central server randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 3:
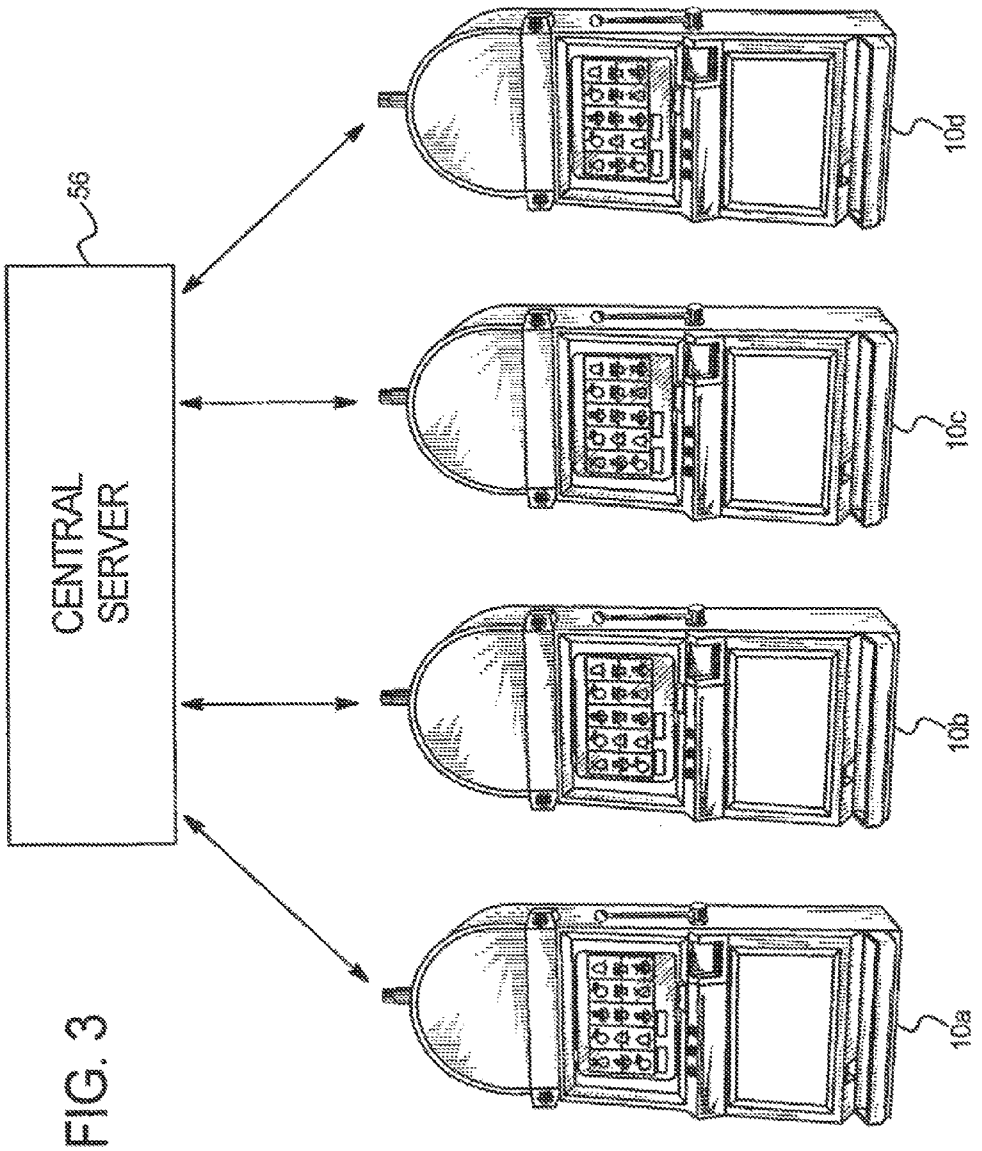
FIG. 3 is a schematic block diagram illustrating a plurality of gaming terminals in communication with a central controller in accordance with one embodiment of the gaming system disclosed herein.

In one embodiment, as illustrated in FIG. 3, one or more of the gaming devices 10*a*, 10*b*, 10*c* . . . 10*z* are in communication with each other and/or at least one central server, central controller or remote host 56 through a data network or remote communication link. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller. The terms central server, central controller and remote host are used interchangeably herein.

In one embodiment, the gaming machines linked or in communication with the central server may be of the same type or of different types of gaming machines. The linked gaming machines may have the same primary game or two or more different primary games. The number of gaming machines in the gaming system can vary as desired by the implementer of the gaming system. These gaming machines are referred to herein alternatively as the group of gaming machines, the linked gaming machines or the system gaming machines.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on an intermittent award in addition to any award provided for winning the bingo game as described above. In this embodiment, if one or more elements are marked in supplemental patterns within a designated number of drawn elements, an intermittent award or value associated with the marked supplemental pattern is provided to the player as part of the predetermined game outcome. For example, if the four corners of a bingo card are marked within the first twenty selected elements, an intermittent award of $10 is provided to the player as part of the predetermined game outcome. It should be appreciated that in this embodiment, the player of a gaming device may be provided an intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL). T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Supplemental Games

Figure 4:
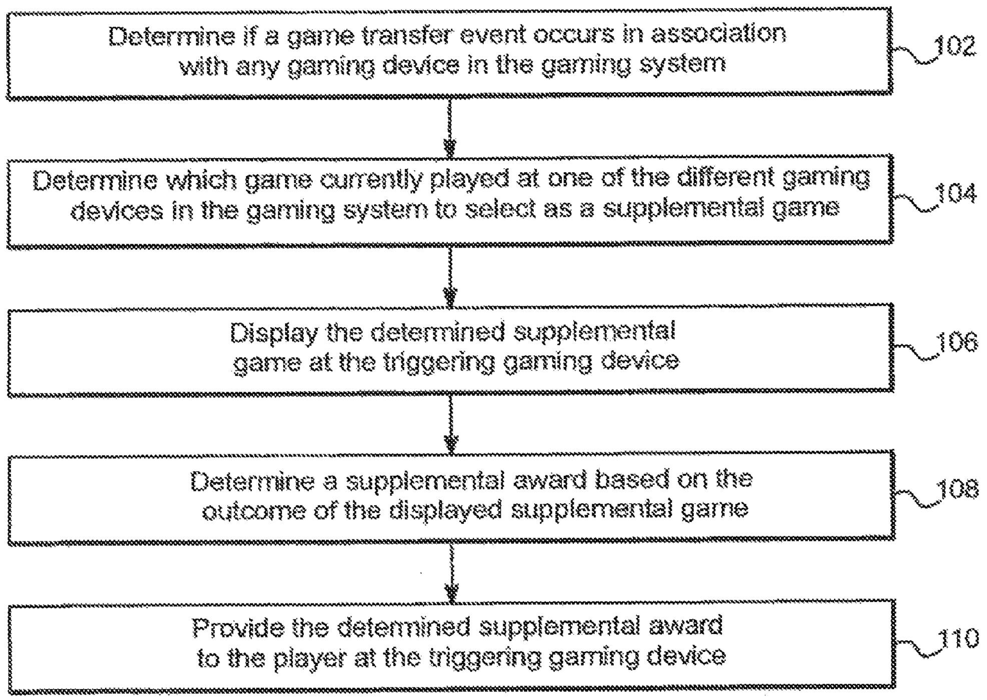
FIG. 4 is a flow-chart of one embodiment of the gaming system disclosed herein illustrating an occurrence of a game transfer event and a supplemental game associated with a supplemental gaming device provided in association with a triggering gaming device.

In operation of one embodiment of the gaming system and method disclosed herein, the central server, central controller or remote host determines if a game transfer event or condition occurs in association with any gaming device in the gaming system as indicated in block 102 of FIG. 4. For example, the central server determines that a game transfer event occurs in association with gaming device 10*a* (i.e., the gaming device designated as the triggering gaming device for this game transfer event).

In one embodiment, a game transfer event occurs based on an outcome associated with one or more plays of any primary game and/or an outcome associated with one or more plays of any secondary game of the gaming machines in the gaming system. In one such embodiment, the determination of when to cause a game transfer event to occur is symbol driven based on the generation of one or more designated symbols or symbol combinations. In this embodiment, when the designated symbol combination is randomly generated, the game transfer event associated with this symbol-driven event occurs.

In another embodiment, at least one and preferably a plurality of game transfer events occur in an apparently random fashion as perceived by the players of these gaming machines. In one embodiment, the gaming devices do not provide any apparent reasons to the players for the occurrences of such game transfer events. In this embodiment, causing a game transfer event to occur is not triggered by any displayed event in the primary game or based specifically on any of the displayed plays of any primary game or on any of the displayed plays of any secondary game of the gaming machines in the system. That is, these game transfer events are caused without any explanation or alternatively with simple explanations.

In one such embodiment, one or more game transfer events are each associated with a range of values. In this embodiment, a game transfer event will occur when an amount of coin-in associated with a player, a group of players, or a group of gaming devices in the gaming system increments to a game transfer event hit value within the range of values associated with that game transfer event. In different embodiments, the game transfer event hit value at which a game transfer event will occur is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In one embodiment, a game transfer event occurs based on an elapsed period of time. In this embodiment, after a designated period of time, the central server causes a game transfer event to occur. For example, if a player is actively playing (as described below) a gaming device for five minutes, the central server causes a game transfer event to occur in association with that gaming device. In another such embodiment, a designated time is set, such as a time of day, for when a game transfer event will occur. In this embodiment, such a set time may be based on historic data. In different embodiments, the period of time which must elapse for the central server to cause one or more game transfer events to occur is predetermined, randomly determined, determined based on a random determination by the central controller, determined based on a random determination by one or more gaming devices, determined based on the status of one or more players (such as determined through a player tracking system), determined based on a generated symbol or symbol combination, determined based on one or more side wagers placed, determined based on a player's primary game wager, determined based on the amount of coin-in accumulated in one or more pools, or determined based on any other suitable method or criteria.

In another alternative embodiment, a game transfer event occurs based on a predefined variable reaching a defined parameter threshold. For example, a game transfer event occurs when the $500^{th}$ different player has played a gaming machine in the gaming system (ascertained from a player tracking system or through game activity level monitoring). In different embodiments, the predefined parameter thresholds include a length of time, a length of time after a certain dollar amount is hit, a wager level threshold for a specific machine (which gaming device is the first to contribute $25), a number of gaming machines active, or any other parameter that defines a suitable threshold.

In another embodiment, a game transfer event occurs based upon gaming system operator defined player eligibility parameters stored on a player tracking system (such as a player tracking system accessible with a player tracking card). For example, a gaming system operator may choose to only enable players of the highest player tracking status to be eligible for a game transfer event. In this embodiment, the parameters for eligibility are defined by the gaming system operator based on any suitable criterion. In one embodiment, the central controller/gaming device processor recognizes the player's identification (via the player tracking system) such as when the player inserts their player tracking card in the gaming machine. The central server/gaming device processor determines the player tracking level of the player and if the current player tracking level defined by the gaming system operator is eligible for a game transfer event to occur. In one embodiment, the gaming system operator defines minimum bet levels required for the game transfer event to occur based on the player's card level. In this embodiment, different bet amounts are required to be eligible to cause different game transfer events to occur. In another embodiment, different side bets or side-wager amounts are required to cause different game transfer events to occur. Once the central controller/gaming device processor determines which players are eligible, any suitable method for causing the game transfer event to occur may be employed.

Another embodiment for determining if a game transfer event occurs includes a system determination, wherein the game transfer event occurs due to a random selection by the central controller. In one embodiment, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria).

In one such embodiment, based on the gaming machine's state, the central controller determines which of these gaming machines causes a game transfer event to occur. In another embodiment, the determination of if a game transfer event will occur is based on the relative proportion of gaming/wagering activity at each gaming device in the gaming system. In this embodiment, the player who consistently places a higher wager is more likely to cause a game transfer event to occur associated with that player or that player's gaming device than a player who consistently places a minimum wager.

In another embodiment, a game transfer event occurs based on a determination if any numbers allotted to a gaming device match a randomly selected number. In this embodiment, upon or prior to each play of each gaming machine, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, a game transfer event is determined to occur.

In one embodiment, the central controller and an individual gaming machine work in conjunction with each other to determine if a game transfer event occurs, for example through an individual gaming machine meeting a predetermined requirement or criteria established by the central controller. In another embodiment, an individual gaming machine may determine when a game transfer event occurs. In another embodiment, an individual gaming machine may determine when at least one game transfer event occurs and the central controller determines when at least one game transfer event occurs. In different embodiments, the occurrence of a game transfer event is predetermined, randomly determined, determined based on the player's status (such as determined through a player tracking system), determined based on a weighted parameter, determined based on one or more side wagers placed, or determined based on the player's primary game wager. It should be appreciated that any suitable method of determining if a game transfer event occurs may be implemented in accordance with the gaming system disclosed herein.

In one embodiment, upon an occurrence of a game transfer event in association with a gaming device in the gaming system (i.e., the triggering gaming device), as indicated in block 102 of FIG. 4, the central server determines which game played at one of the different gaming devices in the gaming system to select as a supplemental game as indicated in block 104. In one embodiment, the central server selects a game independent from the game played at the triggering gaming device to function as the supplemental game. In another embodiment, the central server selects a game directly or indirectly related to the game played at the triggering gaming device to function as the supplemental game.

In one embodiment, the play of each of the gaming machines in the gaming system is monitored by the central server. That is, the central server or controller maintains or keeps track of the play of each game and/or other activity on or relating to the gaming machines in the gaming system. In one such embodiment, the central server monitors the status of each game played at each gaming device in the gaming system and utilizes this data or information to determine which games played independent from the triggering gaming device to display and provide as a supplemental game.

In one such embodiment, upon an occurrence of a game transfer event in association with a player or a player's currently played gaming device, each of the gaming devices in the gaming system communicates information or data to the central server regarding that gaming device and the central server determines, based on this communicated data, which game played at which gaming device in the gaming system to display and provide as a supplemental game. In another embodiment, when the central server communicates or downloads information or data relating to the currently played game program to each of the gaming devices in the gaming system, the central server logs in and/or stores certain data or information, such as the denomination or paytable utilized. In this embodiment, upon an occurrence of a game transfer event, the central server determines, based on this stored data, which game played at which gaming device in the gaming system to display and provide as a supplemental game. In different embodiments, for each game played, for each of a plurality of games played or at designated intervals, each of the gaming devices in the gaming system communicates information or data to the central server regarding that gaming device. In these embodiments, upon an occurrence of a game transfer event, the central server determines, based on this communicated data, which game played at which gaming device in the gaming system to display and provide as a supplemental game.

In one embodiment, the central server selects which game to display and provide as a supplemental game based on one or more parameters or characteristics of one or more of the monitored games in the gaming system. In one such embodiment, the central server selects which game to display as a supplemental award based on the average expected payout of each played game in the gaming system. In another such embodiment, the central server selects which game to display as a supplemental award based on the available awards which may be provided for each played game in the gaming system. In different embodiments, the selection of which game played independent from the triggering gaming device to display and provide as a supplemental game is predetermined, randomly determined, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools, determined based on player preference, determined based on one or more base game events, determined based on a suitable player selection or determined based on any other suitable method or criteria.

In one such embodiment, the central server maintains a database or look-up table which includes, for each gaming device in the gaming system, the different games played which may be selected to function as a supplemental game. In one embodiment, the database or look-up table includes the games available at, but not currently being played at another gaming device in the gaming system. In another embodiment, the database or look-up table includes the games available to be played at the player's current gaming device and/or the games available to be communicated from the central server or remote host. In another embodiment, the database or look-up table includes the games available at one or more different gaming devices in the gaming system, such as the games available at the other gaming devices of a gaming establishment or a sub-set of the games available at the other gaming devices of a gaming establishment.

In another embodiment, if a game transfer event is determined to occur in association with a player or a player's currently played gaming device, the central server selects a game associated with another gaming device in the gaming system. In this embodiment, if another player at the other gaming device is playing the selected game, the central server selects that game as the supplemental game. In this embodiment, if another player at the other gaming device is not playing the selected game, the central server selects another game associated with another gaming device in the gaming system. In another embodiment, if a game transfer event is determined to occur in association with a player or a player's currently played gaming device, the central server selects a game associated with another gaming device in the gaming system and provides that game as a supplemental game, regardless of if another player at the other gaming device is playing the selected game.

In one embodiment, for each gaming device, the determination of which games at which gaming devices in the gaming system may be selected to function as a supplemental game is based on one or more parameters of the triggering gaming device and one or more parameters of the games played at the other gaming devices in the gaming system. For example, for a first gaming device, the database may include entries which indicate that for the type of gaming device the first gaming device is and for the average expected payout associated with the first gaming device, a group of thirty different gaming devices in the gaming system have the appropriate parameters which correspond to the first gaming device (such as based on the parameter of average expected payout) and thus the games played at these thirty gaming devices may function as supplemental games. In this example, after identifying the possible games which may function as a supplemental game for the triggering gaming device, the central server selects one of these identified games as the supplemental game. In one such embodiment, which game is selected as a supplemental game is determined based on matching one or more characteristics or parameters, such as wager level, denomination, number of lines played, gaming device manufacturer and/or average expected return, of the monitored game and the game at the triggering gaming device. In different embodiments, this selection of the identified games is predetermined, randomly determined, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In another embodiment, if a game transfer event is determined to occur in association with a player or a player's currently played gaming device, the central server determines which game played at a gaming device in the gaming system to select as a supplemental game based on a player's player tracking status, such as determined through a player tracking system. In this embodiment, if a first player of a designated player tracking status is playing a first gaming device and a game transfer event occurs, the central server selects a game played by a second player of the same designated player tracking status to function as the supplemental game. For example, if a gold level player is playing a first gaming device and a game transfer event occurs (such that the first gaming device is designated the triggering gaming device), the central server selects a game played by another gold level player at another gaming device in the gaming system to function as the supplemental game.

In one such embodiment, the central server maintains a database or look-up table which includes, for each identified player in the gaming system, the different games played by other players at different gaming devices in the gaming system which may be selected to function as a supplemental game. In this embodiment, for each player, the determination of which games at which gaming devices in the gaming system may be selected to function as a supplemental game is based on the player tracking level status of the player currently playing such games, one or more parameters of the triggering gaming device and/or one or more parameters of the games played at other gaming devices in the gaming system. For example, for a first player, the database may include entries which indicate that for the first player's player tracking status (and possibly the type of gaming device the first player is currently playing, such as the average expected payout of the gaming device the first player is playing), a group of ten different players currently playing gaming devices in the gaming system have the appropriate player tracking level status which corresponds to the first player and thus the games played by these ten players may function as supplemental games. In this example, after identifying the possible games which may function as a supplemental game for the first player at the triggering gaming device, the central server selects one of these identified games as the supplemental game. In different embodiments, this selection of the identified games is predetermined, randomly determined, determined based on a random determination by the central controller, determined based on a random determination at the gaming machine, determined based on a weighted parameter, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system enables a plurality of players to form one or more groups. In one embodiment, the central server determines one or more groups of gaming devices. In another embodiment, the central server determines one or more groups of players or any combination thereof. In another embodiment, the gaming system operator determines one or more groups of gaming devices or one or more groups of players. In another embodiment, the gaming system enables one or more players to input one or more player preferences, such as a list of other players, to form a group. In different embodiments, one or more formed groups are determined based on a type of gaming device, determined based on a game theme, determined based on paytables or average expected payback percentages, determined based on one or more gaming device parameters, characteristic, or configurations, predetermined, randomly determined, determined based on a generated symbol or symbol combination, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In these embodiments, if a game transfer event is determined to occur, the central server determines which game played by one of the players in the same group of players as the player at the triggering gaming device to select as a supplemental game. In another of these embodiments, if a game transfer event is determined to occur, the central server determines which game played at a gaming device in the same group of gaming devices as the triggering gaming device to select as a supplemental game. For example, if a first player is playing a first gaming device and a game transfer event occurs (such that the first gaming device is designated the triggering gaming device), the central server selects a game played by one of the players on the player's inputted list to function as the supplemental game.

In another embodiment, the gaming system enables a player to define a list of games they like and if a game transfer event occurs, the gaming system selects a game to function as the supplemental game from this list. In one such embodiment, certain games may be restricted from the list if they are incompatible with one or more of the parameters, such as the average expected payback, of the player's current game.

In one embodiment, the central server selects a game to function as the supplemental game from a same or similar type of gaming device as the triggering gaming device. In another embodiment, the central server selects a game to function as the supplemental game from a different type of gaming device than the triggering gaming device. For example, if a reel gaming device is associated with a game transfer event, the central server selects a video poker game associated with a different gaming device in the gaming system to function as the supplemental game. In one embodiment, the central server selects a primary game associated with another gaming device in the gaming system to function as the supplemental game. In another embodiment, the central server selects a secondary game associated with another gaming device in the gaming system to function as the supplemental game. It should be appreciated that the central server is operable to select any suitable type of game associated with any suitable gaming device in the gaming system to function as the supplemental game.

In another embodiment, the central server selects a game to function as the supplemental game from a type of gaming medium different than the type of gaming medium associated with the triggering gaming device. Such alternative gaming mediums which may be selected to provide a game to function as the supplemental game include, but are not limited to, games played over a network setup, such as an internet, games played utilizing a hand-held device, games played at non-dedicated gaming terminals, games played which are downloaded from a central server, games played at a multi-player gaming station, such as a multi-player gaming table, and games played at an intelligent gaming table or wagering chip tracking system, such as a virtual gaming table which utilizes one or more surface computing mechanisms and one or more of a plurality of display devices to provide virtual playing cards and/or virtual wagering chips. For example, if a reel gaming device is associated with a game transfer event, the central server selects a roulette game provided at a multi-player gaming table in the gaming system to function as the supplemental game. It should be appreciated that the central server is operable to select any suitable type of game associated with any suitable gaming medium in the gaming system to function as the supplemental game.

In one embodiment, the central server selects a game currently or substantially currently played by another player at another gaming device in the gaming system to function as the supplemental game. In one such embodiment, a game is played as a supplemental game on a triggering gaming device in real-time or near real-time (accounting for any network latency) to when the same game is played as a non-supplemental game on another gaming device in the gaming system. In another embodiment, the central server stores a plurality of games played at the gaming devices in the gaming system. In one such embodiment, a game storage device which has a cache for each participating game is utilized for at least one game play sequence (which can be replayed on any gaming device as a supplemental game). In one embodiment, the central server selects one of the stored games previously played to function as the supplemental game. In another embodiment, if the central server is unable to select a game currently or substantially currently played by another player at another gaming device in the gaming system to function as the supplemental game, the central server selects a stored game previously played to function as the supplemental game. It should be appreciated that the central server is operable to select a game at any point in the play of that game to select to function as a supplemental game.

In one embodiment, after determining which played game at which gaming device in the gaming system will function as the supplemental game, the central server causes the determined supplemental game to be displayed at the triggering gaming device as illustrated in block 106 of FIG. 4. It should be appreciated that while a game displayed to a first player may function as a supplemental game for that first player, the same game may simultaneously function as a non-supplemental game to a second player actively playing that game.

Accordingly, one game may be concurrently characterized as both a supplemental game for a player at a designated first or triggering gaming device and as a non-supplemental game for another player at a designated second or supplemental gaming device.

In one such embodiment, the triggering gaming device displays the supplemental game via a service window. In this embodiment, the displayed supplemental game does not interrupt or is otherwise independent of any primary game or bonus game played at the triggering gaming device. In another embodiment, the triggering gaming device interrupts any primary game or bonus game played at the triggering gaming device to display the supplemental game to the player. In one embodiment, the supplemental game is displayed on a secondary display device of the triggering gaming device. In another embodiment, the supplemental game is displayed on one or more overhead display devices associated with the triggering gaming device. In another embodiment, the supplemental game is additionally displayed on one or more display devices remote from the triggering gaming device, such as at another location in a gaming establishment.

In one embodiment, the play of the supplemental game is displayed at the triggering gaming device in real-time or substantially in real-time compared to when the supplemental game is played at the supplemental gaming device. In another embodiment, the play of the supplemental game is displayed at the triggering gaming device on a delay to when the supplemental game is played at the supplemental gaming device. In another embodiment, the play of a previously played and stored supplemental game is displayed at the triggering gaming device following when the supplemental game is played at the supplemental gaming device.

As illustrated in blocks 108 and 110 of FIG. 4, based on the outcome of the displayed supplemental game, a supplemental award is determined and provided to the player at the triggering gaming device. That is, the central server is operable to provide that a game currently played at a gaming device in the gaming system is simultaneously, substantially simultaneously, sequentially or in an overlapping manner associated with one or more different gaming devices in the gaming system wherein any awards provided at such gaming devices are based, at least in part, on the results of that game.

In one embodiment, the player at the triggering gaming device is provided the same award for the play of the supplemental game as the player at the supplemental gaming device. In another embodiment, the player at the triggering gaming device is provided a different award for the play of the supplemental game than the player at the supplemental gaming device. In one such embodiment, the player at the triggering gaming device is provided a multiple of the award the player at the supplemental gaming device is provided for the play of the supplemental game. In different embodiments, the supplemental award provided to the player at the triggering gaming device is determined based on the type of gaming device of the triggering gaming device or supplemental gaming device, determined based on a game theme, determined based on the paytables or average expected payback percentages of the triggering gaming device or supplemental gaming device, determined based on one or more gaming device parameters, characteristic, or configurations of the triggering gaming device or supplemental gaming device, predetermined, randomly determined, determined based on a generated symbol or symbol combination, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In one embodiment, after determining to provide the player at the triggering gaming device an award in the supplemental game, the central server signals to the triggering gaming device to provide such an award. In one embodiment, a message controller or message module associated with the central server sends one or more messages to be displayed by the triggering gaming device to inform the player that an award will be provided for the play of the supplemental game. In one embodiment, the messaging is positioned and/or timed to not interfere with the game currently played at the triggering gaming device. In another embodiment, the gaming establishment operator is enabled, via the message controller, to configure the presentation, look, and feel of the messages displayed to the player.

In one embodiment, one or more of the supplemental awards are each funded, at least in part, based on the wagers placed on the primary games of the gaming machines in the gaming system. In another embodiment, each supplemental award provided by a triggering gaming device is accounted for in the paytable of the triggering gaming device. In this embodiment, the triggering gaming devices provides a bonus award in the form of a play of the supplemental game and any supplemental award provided, wherein such a bonus award is funded by and accounted for in the paytable of the triggering gaming device. In another embodiment, one or more of the supplemental awards are each funded, at least in part, based on an amount provided by one or more marketing and/or advertising departments, such as a casino's marketing department. In another embodiment, one or more of the supplemental awards are funded as part of a promotion associated with a gaming establishment. In another embodiment, one or more of the supplemental awards are each funded, at least in part, based on an amount of coin-in accumulated in one or more pools. In another embodiment, one or more of the supplemental awards are each funded, at least in part, via a player tracking system. It should be appreciated that any suitable manner of funding one or more of the supplemental awards disclosed herein may be implemented in accordance with the gaming system disclosed herein.

In another embodiment, one or more of the supplemental awards are each funded, at least in part, via a side bet or side wager. In one such embodiment, a player must place or wager a side bet to be eligible to win an award associated with an outcome in a supplemental game. In one embodiment, the player must place the maximum bet and the side bet to be eligible to win an award associated with an outcome in a supplemental game. In another embodiment, if the player places or wagers the required side bet, the player may wager at any credit amount on any payline (i.e., the player need not place the maximum bet and the side bet to be eligible to win an award associated with an outcome in a supplemental game). In one such embodiment, the greater the player's wager (in addition to the placed side bet), the greater the odds or probability that the player will win an award associated with an outcome in a supplemental game.

In one embodiment of the gaming system disclosed herein, the triggering gaming device merely displays the supplemental game to the player and provides the player any award associated with any determined game outcome in the supplemental game as a supplemental or bonus award. In this embodiment, similar to the manner in which a player sits back and watches any provided free spins, the player at the triggering gaming device passively observes the supplemental game being played by a different player at the supplemental gaming device and is provided an award based on this play. In one such embodiment, the triggering gaming device displays and provides a player a bonus token or symbol which results in a short celebration. The celebration informs the player that they have entered a bonus mode where a supplemental game will be played. At this point, the triggering gaming device displays the supplemental game, the triggering gaming device provides the player any award associated with the supplemental game and the triggering gaming device return to the game they were previously playing.

Figure 5A:
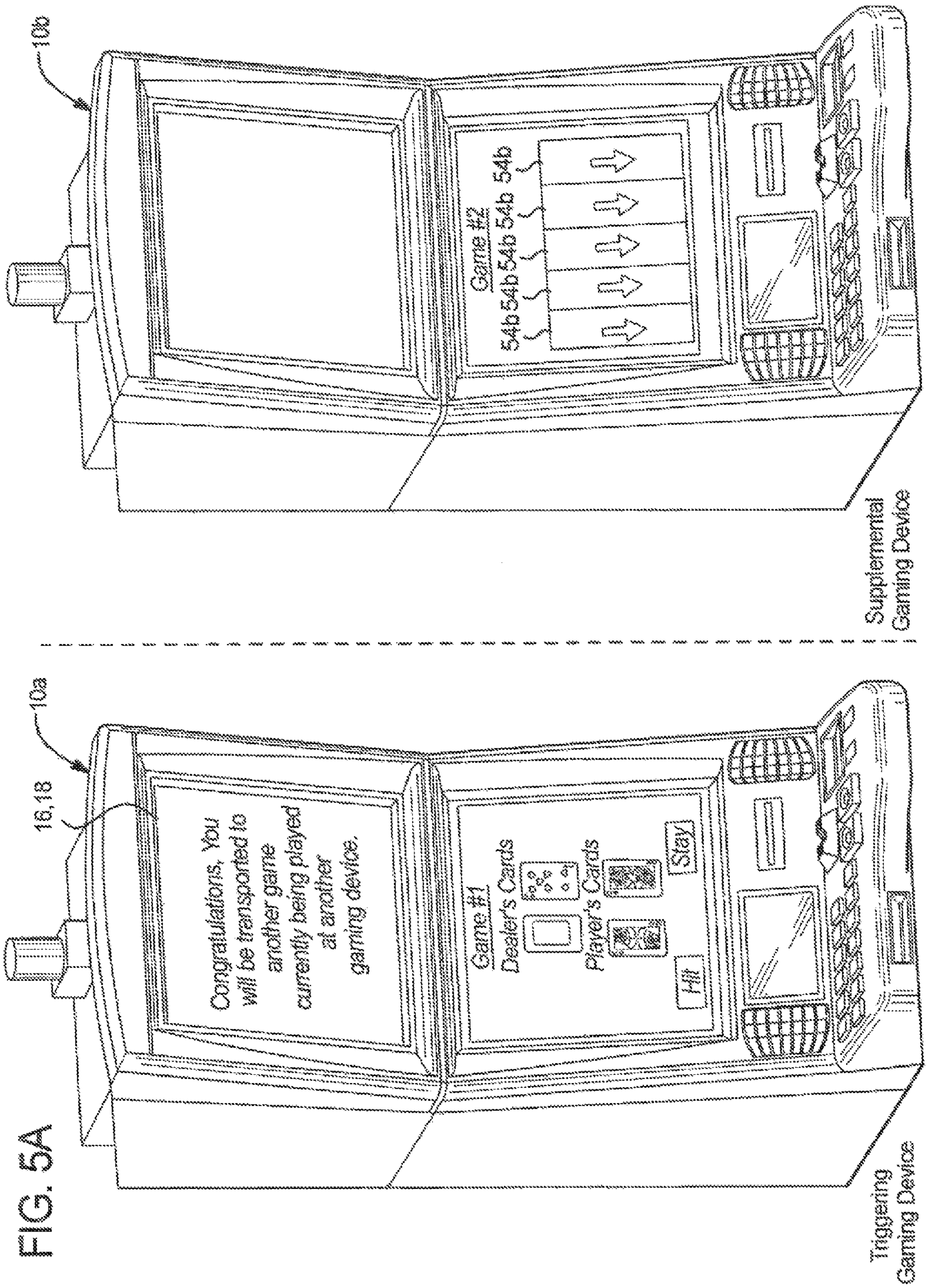
FIGS. 5A, 5B and 5C are front-side perspective views of one embodiment of a plurality of gaming devices of the gaming system disclosed herein illustrating a play of a supplemental game associated with a supplemental gaming device which is displayed at a triggering gaming device.

For example, as seen in FIG. 5A, if gaming device 10*a* is currently playing a blackjack game (i.e., Game #1 in this example), gaming device 10*b* is currently playing a slot game (i.e., Game #2 in this example) and a game transfer event occurs in association with gaming device 10*a* (such that gaming device 10*a* is designated a triggering gaming device), the central server determines that the slot game played at gaming device 10*b* (i.e., the designated supplemental gaming device) will function as a supplemental game. Appropriate messages such as "CONGRATULATIONS, YOU WILL BE TRANSPORTED TO ANOTHER GAME CURRENTLY BEING PLAYED AT ANOTHER GAMING DEVICE" may be provided to the player at the triggering gaming device visually, or through suitable audio or audiovisual displays.

Figure 5B:
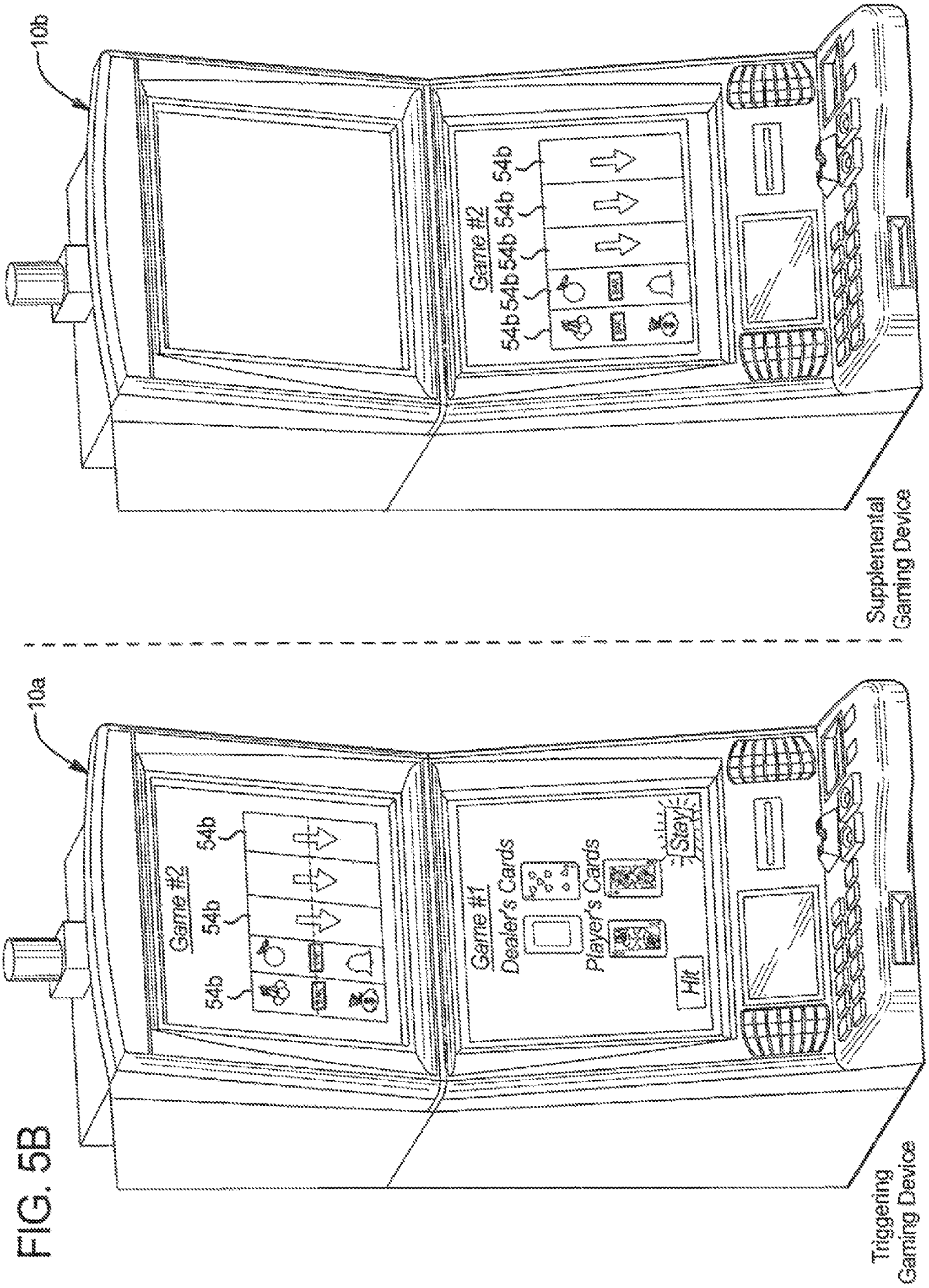
Figure 5C:
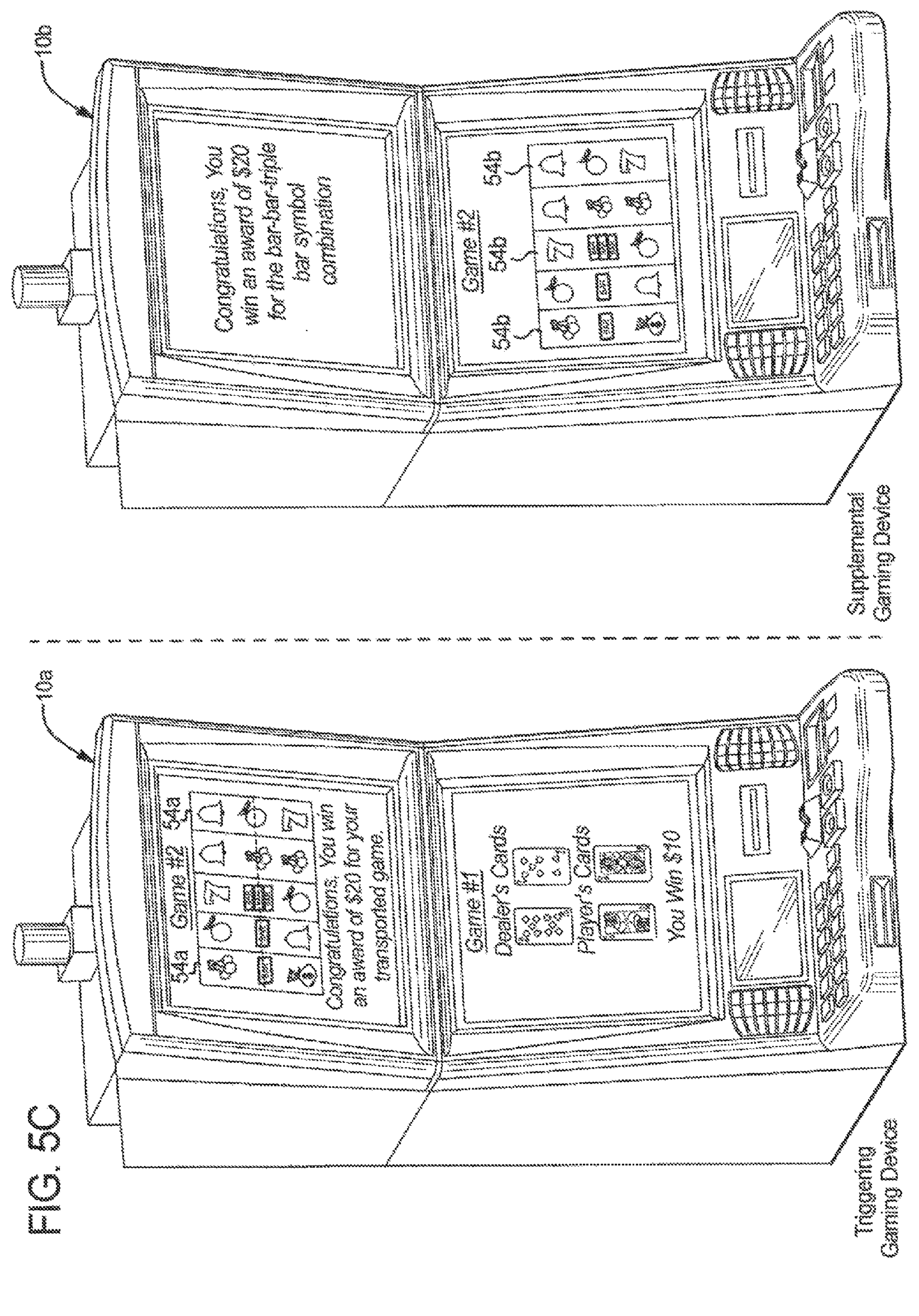

As seen in FIG. 5B, the central server causes the supplemental slot game to be displayed to the player at triggering gaming device 10*a*, wherein the player at supplemental gaming device 10*b* is unaffected by the concurrent display of the slot game. The player at the supplemental gaming device 10*b* continues the play of the slot game and is provided an award as seen in FIG. 5C. Appropriate messages such as "CONGRATULATIONS, YOU WIN AN AWARD OF $20 FOR THE BAR-BAR-TRIPLE BAR SYMBOL COMBINATION" may be provided to the player at the supplemental gaming device visually, or through suitable audio or audiovisual displays.

In this example, the award determined for the supplemental slot game is also provided to the player at the triggering gaming device 10*a* as a supplemental award. It should be appreciated that in this example, the player at the triggering gaming device continued the play of the primary blackjack game and was also provided an award for the play of that game. Appropriate messages such as "CONGRATULATIONS, YOU WIN AN AWARD OF $20 FOR YOUR TRANSPORTED GAME" may be provided to the player at the triggering gaming device visually, or through suitable audio or audiovisual displays.

In another embodiment of the gaming system disclosed herein, the player at the triggering gaming device is enabled to interact with or actively participate in one or more aspects of the supplemental game, such as making one or more choices or selections in the play of the supplemental game. In this embodiment, based at least on this players interaction or participation in the play of the supplemental game, the player at the triggering gaming device is provided a supplemental award for the play of the supplemental game. In one embodiment, the players at the triggering gaming device and supplemental gaming devices play together or otherwise cooperate in the play of the supplemental game, such as by both experiencing a free spin of a game. In another embodiment, the players at the triggering gaming device and supplemental gaming devices compete against each other in the play of the supplemental game. In one such embodiment, the players compete per game, such as a spin of the reels, wherein any award for the game is provided to one of the players. In another embodiment, the player at the triggering gaming device and the player at the supplemental gaming device each pick a different symbol. In this embodiment, one or more games are played wherein the gaming device provides an additional award to the player that picked a symbol that was generated more often in the played games.

Figure 6A:
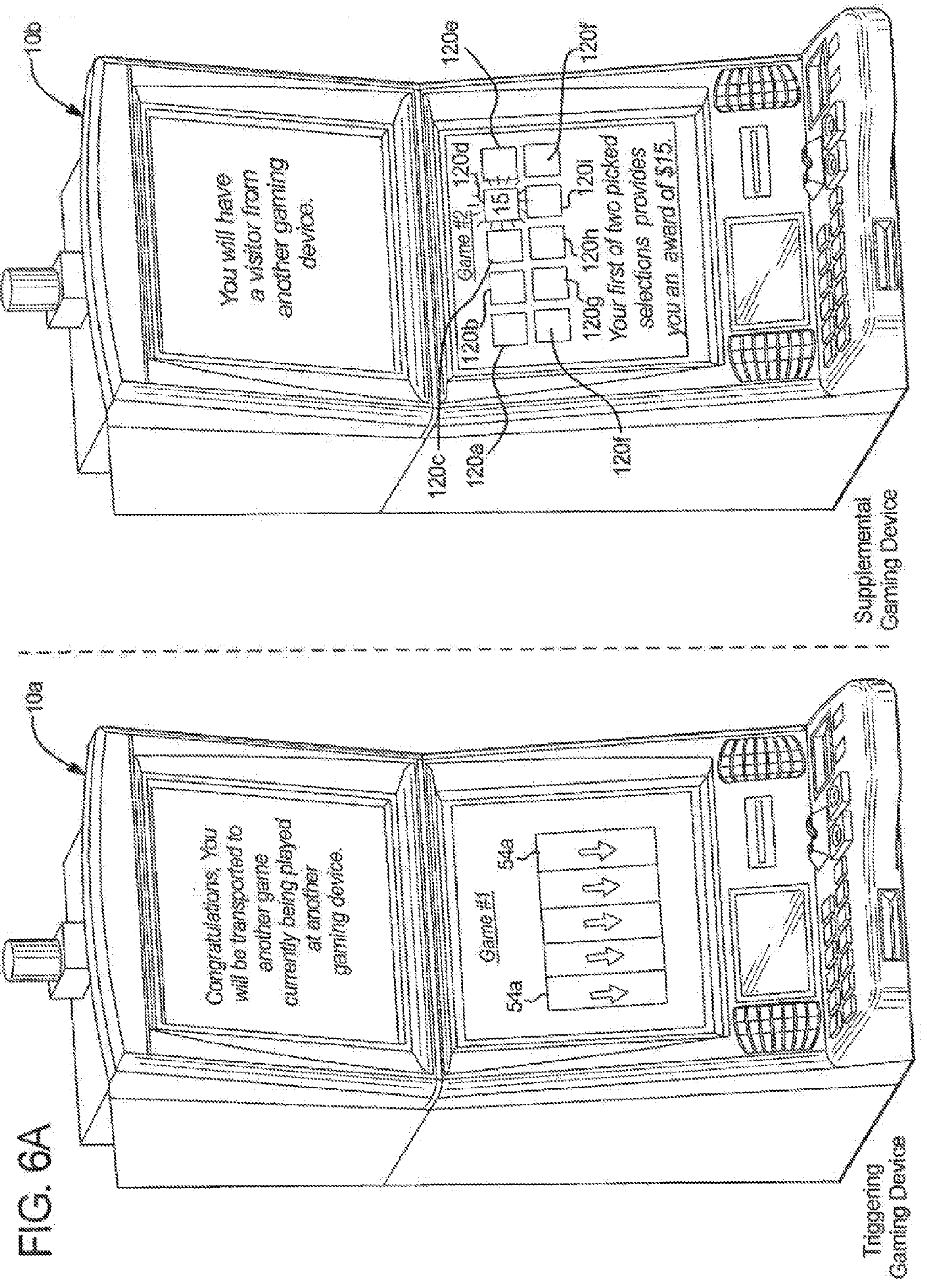
FIGS. 6A, 6B and 6C are front-side perspective views of another embodiment of a plurality of gaming devices of the gaming system disclosed herein illustrating a play of a supplemental game associated with a triggering gaming device and a supplemental gaming device.

For example, as seen in FIG. 6A, if gaming device 10*a* is currently playing a slot game (i.e., Game #1 in this example), gaming device 10*b* is currently playing a selection game which includes a plurality of selection 120 associated with a plurality of awards (i.e., Game #2 in this example) and a game transfer event occurs in association with gaming device 10*a* (such that gaming device 10*a* is designated a triggering gaming device), the central server determines that the selection game played at gaming device 10*b* (i.e., the designated supplemental gaming device) will function as a supplemental game. Appropriate messages such as "CONGRATULATIONS, YOU WILL BE TRANSPORTED TO ANOTHER GAME CURRENTLY BEING PLAYED AT ANOTHER GAMING DEVICE" may be provided to the player at the triggering gaming device visually, or through suitable audio or audiovisual displays. Further appropriate messages such as "YOU WILL HAVE A VISITOR FROM ANOTHER GAMING DEVICE" may be provided to the player at the supplemental gaming device visually, or through suitable audio or audiovisual displays.

Figure 6B:
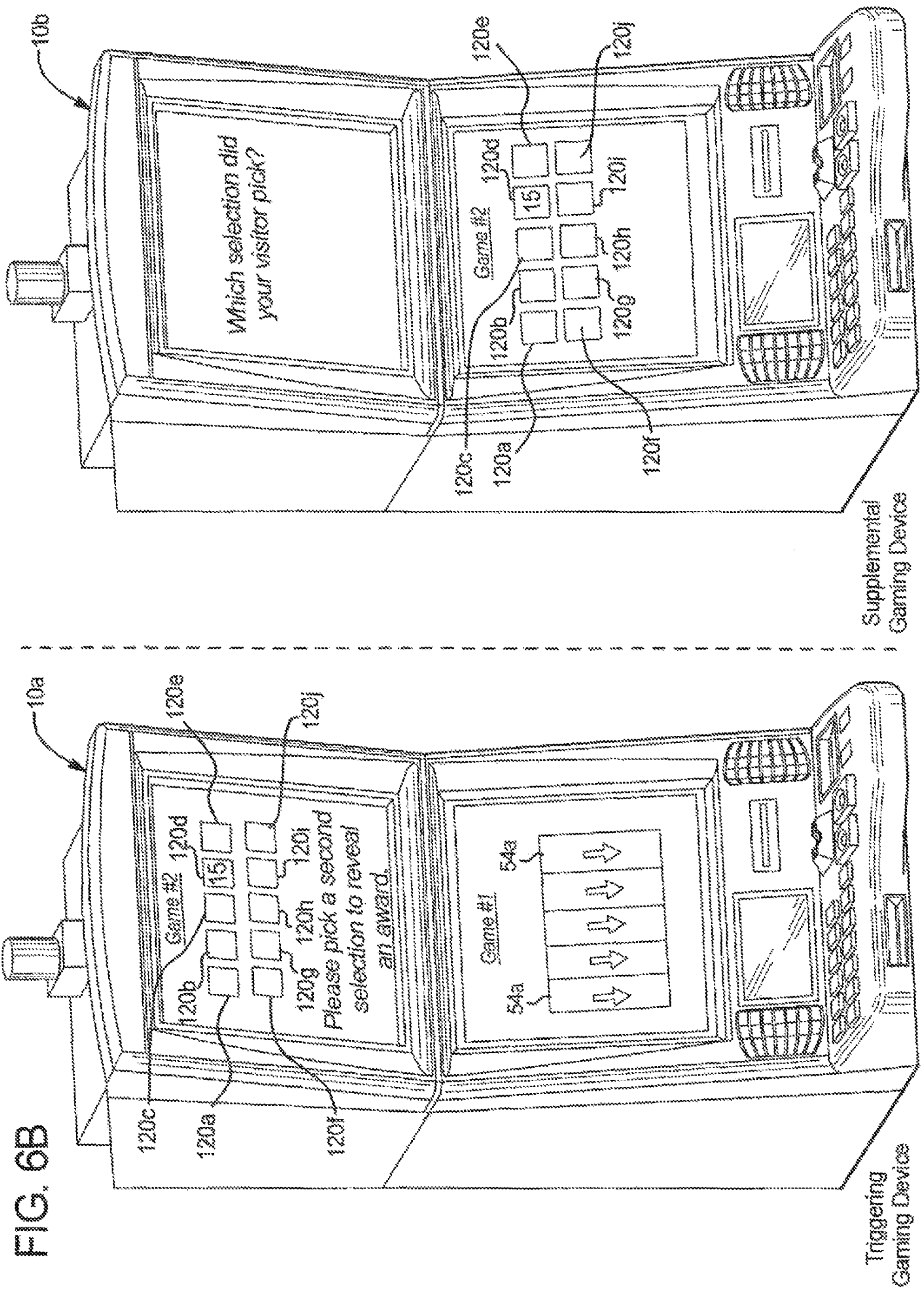

As seen in FIG. 6B, the central server causes the supplemental selection game to be displayed to the player at triggering gaming device 10*a*. In this example, the player at the supplemental gaming device has previously picked selection 120*d* which the supplemental gaming device revealed to be associated with an award of $15. Accordingly, when the supplemental game is displayed to the player at the triggering gaming device, selection 120*d* is revealed to be associated with an award of $15.

As seen in FIG. 6B, the gaming system enables the player at triggering gaming device 10*a* to select one of the plurality of selections in the supplemental game. It should be appreciated that the selection game and any picks by the player at the triggering gaming device are displayed to the player at the supplemental gaming device. Appropriate messages such as "PLEASE PICK A SECOND SELECTION TO REVEAL AN AWARD" may be provided to the player at the triggering gaming device visually, or through suitable audio or audiovisual displays. Further appropriate messages such as "WHICH SELECTION DID YOUR VISITOR PICK?" may be provided to the player at the supplemental gaming device visually, or through suitable audio or audiovisual displays.

Figure 6C:
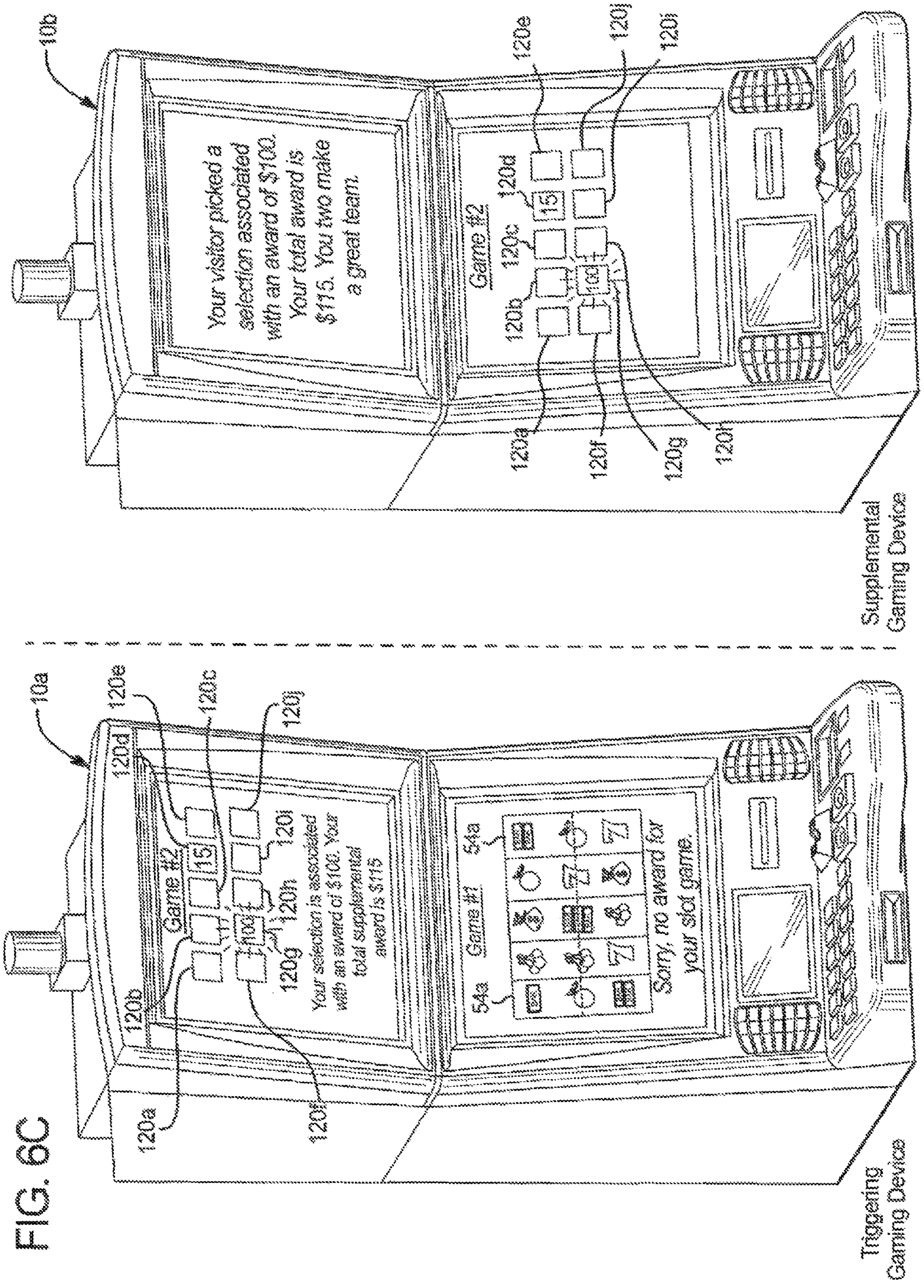

In this example, as seen in FIG. 6C, the player at triggering gaming device 10*a* picked selection 120*g* which the triggering gaming device revealed to be associated with an award of $100. This selection is also displayed to the player at supplemental gaming device 10*b*. Accordingly, the player's at triggering gaming device 10*a* and supplemental gaming device 10*b* are both provided an award of $115 for the play of the selection game. Appropriate messages such as "YOUR SELECTION IS ASSOCIATED WITH AN AWARD OF $100" and "YOUR TOTAL SUPPLEMENTAL AWARD IS $115" may be provided to the player at the triggering gaming device visually, or through suitable audio or audiovisual displays. Further appropriate messages such as "YOUR VISITOR PICKED A SELECTION ASSOCIATED WITH AN AWARD OF $100", "YOUR TOTAL AWARD IS $115" and "YOU TWO MAKE A GREAT TEAM" may be provided to the player at the supplemental gaming device visually, or through suitable audio or audiovisual displays.

In another embodiment, the player at the triggering gaming device is enabled to place a supplemental wager on the supplemental game, wherein any award provided in association with the supplemental game is based on the amount of the supplemental wager. For example, if a player at a designated supplemental gaming device is playing a one payline slot game with a wager of $1.00 on the one payline and that slot game is selected to function as the supplemental game, the gaming system enables the player at the triggering gaming device to place a supplemental or side wager or bet on the play of the one payline slot game. In this example, if the player at the triggering gaming device places a supplemental or side wager of $5.00 on the one payline of the supplemental slot game displayed at the triggering gaming device, the gaming system will modify any award provided to the player at the supplemental gaming device for any symbol combination generated in the slot game by a multiplier of 5× and provide any modified award to the player. That is, by placing a supplemental or side bet, the player at the triggering gaming device is utilizing a different paytable for the same generated outcome as the player at the supplemental gaming device.

In different embodiments, the determination of whether to enable the player at the triggering gaming device to place a supplemental or side wager on the outcome generated in the supplemental game is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria. In different embodiments, the quantity or amount the player at the triggering gaming device is enabled to place as a supplemental or side wager on the supplemental game is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In another embodiment, upon an occurrence of a game transfer event, the gaming system enables the player at the triggering gaming device the option to accept or reject one or more plays of a supplemental game. In this embodiment, if the player accepts the supplemental game, the central server proceeds in selecting a supplemental game from the plurality of games played at the plurality of gaming devices in the gaming system. In another embodiment, upon an occurrence of a game transfer event and the selection of a supplemental game, the gaming system enables the player at the triggering gaming device the option to accept or reject one or more plays of the selected supplemental game. In one such embodiment, if the player rejects the selected supplemental game, the central server selects another game played at one of the different gaming devices in the gaming system to function as the supplemental game. In another such embodiment, if the player rejects the selected supplemental game, the player at the triggering gaming device is not displayed a supplemental game.

In another embodiment, upon the occurrence of a game transfer event and the selection of a game to function as a supplemental game, the triggering gaming device enables the player to observe or watch one or more plays of the selected game played on the supplemental gaming device. In one such embodiment, the triggering gaming device enables the player the opportunity to decide which of the observed games will function as the supplemental game. That is, the triggering gaming device enables a player to observe one or more games played at a supplemental gaming device in the gaming system and determine when to obtain a supplemental award, if any, resulting from one of the observed games. In different embodiments, the designated number of games played at a supplemental gaming device which a player at a triggering gaming device may observe is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria. In other different embodiments, the designated amount of time in which a player at a triggering gaming device may observe games played at a supplemental gaming device is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In another embodiment, the gaming system enables a player to participate in a designated number or quantity of supplemental games simultaneously, sequentially or in an overlapping manner. In one such embodiment, the central server selects a quantity of games played (or to be subsequently played) at a gaming device in the gaming system to function as the supplemental games provided to the player at the triggering gaming device. In another such embodiment, the central server selects a quantity of games played (or to be subsequently played) from a plurality of gaming devices in the gaming system to function as the supplemental games provided to the player at the triggering gaming device. In different embodiments, the quantity of games selected to function as supplemental games is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In another embodiment, upon the occurrence of a game transfer event, the central server selects a plurality of games, wherein at least one of the selected games will function as a supplemental game. In this embodiment, the triggering gaming device enables the player to participate in a supplemental game selection sequence, such as any game or sequence disclosed herein, to determine which one of the selected games will function as the supplemental game. In different embodiments, the determination of which one of the selected games will function as the supplemental game is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In another embodiment, the gaming system enables a player to participate in a plurality of supplemental games simultaneously, sequentially or in an overlapping manner. In one such embodiment, if a first gaming device is displaying a first supplemental game (played at a second gaming device in the gaming system) and a game transfer event occurs in association with the first supplemental game, the player at the first gaming device is displayed a second supplemental game (played at a third gaming device in the gaming system) determined for the second gaming device. In this embodiment, the second gaming device is designated as a supplemental gaming device regarding the first supplemental game and is further designated as a triggering gaming device regarding the second supplemental game. In another embodiment, if a game transfer event occurs, a plurality of gaming devices are designated as triggering gaming devices and one or more games played on one or more gaming devices in the gaming system are selected to function as supplemental games. In this embodiment, one or more of the selected games are displayed to the players at the plurality of triggering gaming devices.

In another embodiment, if a game transfer event is determined to occur in association with a player or a player's currently played gaming device, the central server selects as a supplemental game an opportunity to win a progressive award associated with another gaming device in the gaming system (or available to be communicated to another gaming device in the gaming system). In this embodiment, the triggering gaming device will display a progressive award being played for by another player. In this embodiment, if the player playing for the progressive award wins, this player is provided the progressive award and the player at the triggering gaming device is provided an award such as a large cash amount, merchandise, or a trip.

In another embodiment, if a game transfer event occurs, the gaming system disclosed herein selects a game and modifies one or more parameters, aspects or characteristics of the selected game, wherein the modified selected game functions as the supplemental game. In one example of this embodiment, the central server selects a game and modifies one or more aspects of the selected game's paytable, wherein the modified selected game is provided to the player at the triggering gaming device as the supplemental game. In another example of this embodiment, the central server selects a game and modifies the number of activated paylines, wherein the modified selected game is provided to the player at the triggering gaming device as the supplemental game. In these examples, the unmodified selected game is displayed to the player at the supplemental gaming device and the modified selected game is displayed to the player at the triggering gaming device as the supplemental game. In different embodiments, which of any parameters, aspects or characteristics of a game that are modified is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In another embodiment, if a game transfer event occurs for a first gaming device and the game played at a second gaming device is provided to the player of the first gaming device as a supplemental game, the gaming system modifies any award provided to the player at the second gaming device. For example, if a game played at the second gaming device is utilized as a supplemental game for the first gaming device in the gaming system and the game resulted in an award of $5, the player at the first gaming device (who is playing this game as a supplemental game) is provided $5 and the player at the second gaming device is provided a modified award of $10 (or $5×2×). In different embodiments, any modification to any award provided to the player of the non-supplemental game is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

In an alternative embodiment, if a game transfer event occurs in association with a first gaming device, the game played at the first gaming device functions as the supplemental game. In this embodiment, one or more players at different gaming devices in the gaming system are displayed the supplemental game and provided any awards associated with the supplemental game as disclosed herein. In one such embodiment, the gaming system utilizes a shared device or shared multi-outcome symbol display, such as a wheel positioned adjacent to each of a plurality of adjacently arranged gaming devices. In this embodiment, the shared display has a plurality of individual sections and symbols which represent the individual outcomes in the form of awards displayed at each section. In this embodiment, the gaming devices of the gaming system are positioned and spaced apart substantially equally about the perimeter of the shared display, wherein the individual outcome or awards are fixed relative to each other. In one embodiment, upon the occurrence of a game transfer event associated with a first gaming device, the gaming system activates the shared display (i.e., causes a wheel to spin) and causes the award indicted for the first gaming device to be displayed and provided to one or more different gaming devices in the gaming system as a supplemental game.

In another embodiment, upon the occurrence of a game transfer event and prior to selecting and displaying any supplemental games, the gaming system determines a supplemental award to provide to the player. In this embodiment, the gaming system proceeds in selecting supplemental games to provide to the player, wherein the selection is based on the predetermined supplemental award. That is, the total supplemental awards provided for the plays of the supplemental games displayed to the player is equal to or substantially equal to the predetermined supplemental award determination upon the occurrence of the game transfer event.

Information Provided to Player

As indicated above, the supplemental games may be provided to the players of the gaming machines with or without explanation or information provided to the player, or alternatively information can be displayed to the player. In one embodiment, suitable information about the supplemental games can be provided to the players through one or more displays on the gaming machines or additional information displays positioned near the gaming machines, such as above a bank of system gaming machines.

This information can be used to entertain the player or inform the player that a game transfer event has occurred or will occur. Examples of such information are:

(1) that a game transfer event has occurred;

(2) that a game transfer event will shortly occur (i.e., foreshadowing the providing of a supplemental game);

(3) that one or more supplemental games have been displayed to one or more players of the gaming machines in the gaming system;

(4) which gaming machines are displaying supplemental games;

(5) which games currently played that are available to function as supplemental games;

(6) the amount of any supplemental awards won;

(7) number of supplemental games played during a designated period of time; and (8) the average time between supplemental games provided; It should be appreciated that such information can be provided to the players through any suitable audio, audiovisual or visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a housing;

a plurality of input devices supported by the housing; said plurality of input devices including:

(i) an acceptor, and (ii) a cashout device;

at least one display device supported by the housing;

at least one processor; and at least one memory device which stores a plurality of instructions which when executed by the at least one processor cause the at least one processor to operate with the at least one input device and the at least one display device to:

(a) if a physical item is received via the acceptor, establish a credit balance based, at least in part, on a monetary value associated with the received physical item, (b) receive a wager placed on a play of a first game, wherein said credit balance is decreasable based on the wager placed on the play of the first game, (c) for the play of the first game:

(i) randomly determine a first game outcome, (ii) display to a player the randomly determined first game outcome, (iii) determine any first game award associated with the randomly determined first game outcome; and (iv) display to the player to the player any determined first game award associated with the randomly determined first game outcome, wherein said credit balance is increasable based on any determined first game award associated with the randomly determined first game outcome, (d) if a game transfer event occurs independent of any displayed event in the play of the first game:

(i) at least partially concurrently display a play of a second, different game of another device, and (ii) display to the player any award associated with the at least partially concurrently displayed play of the second, different game, wherein:

(A) any displayed award associated with the at least partially concurrently displayed play of the second, different game is displayed in addition to any determined first game award associated with the randomly determined first game outcome, and (B) said credit balance is increasable based on any displayed award associated with the at least partially concurrently displayed play of the second, different game, and (e) if a cashout input is received via the cashout device, cause an initiation of any payout associated with the credit balance.

2. The gaming device of claim 1, wherein the other device includes another gaming device.

3. The gaming device of claim 2, wherein the other gaming device is played by another player.

4. The gaming device of claim 3, wherein the other gaming device displays to the other player any award associated with the at least partially concurrently displayed play of the second, different game.

5. The gaming device of claim 1, wherein the other device includes a server.

6. The gaming device of claim 1, wherein the game transfer event randomly occurs independent of any displayed event in the play of the first game.

7. The gaming device of claim 1, wherein when executed by the at least one processor, the plurality of instructions cause the at least one processor to receive a wager on the at least partially concurrently displayed play of the second, different game.

8. The gaming device of claim 1, wherein when executed by the at least one processor, the plurality of instructions cause the at least one processor to display the at least partially concurrently displayed play of the second, different game in a service window of the at least one display device.

9. A gaming system server comprising:

at least one processor; and at least one memory device which stores a plurality of instructions which when executed by the at least one processor cause the at least one processor to:

(a) receiving data associated with a placement of a wager on a play of a first game at a first gaming device, wherein a credit balance is decreasable based on the wager placed on the play of the first game, said credit balance being:

(i) increasable via an acceptor of a physical item associated with a monetary value, and (ii) decreasable via a cashout device;

(b) for the play of the first game:

(i) randomly determine a first game outcome, (ii) cause at least one display device to display to a player the randomly determined first game outcome, (iii) determine any first game award associated with the randomly determined first game outcome, and (iv) cause the at least one display device to display to the player to the player any determined first game award associated with the randomly determined first game outcome, wherein said credit balance is increasable based on any determined first game award associated with the randomly determined first game outcome, and (c) if a game transfer event occurs independent of any displayed event in the play of the first game:

(i) cause the at least one display device to at least partially concurrently display a play of a second, different game of another device, and (ii) cause the at least one display device to display to the player any award associated with the at least partially concurrently displayed play of the second; different game, wherein:

(A) any displayed award associated with the at least partially concurrently displayed play of the second, different game is displayed in addition to any determined first game award associated with the randomly determined first game outcome, and (B) said credit balance is increasable based on any displayed award associated with the at least partially concurrently displayed play of the second, different game.

10. The gaming system server of claim 9, wherein the other device includes another gaming device.

11. The gaming system server of claim 10, wherein the other gaming device is played by another player.

12. The gaming system server of claim 11, wherein the other gaming device displays to the other player any award associated with the at least partially concurrently displayed play of the second, different game.

13. The gaming system server of claim 9, wherein the game transfer event randomly occurs independent of any displayed event in the play of the first game.

14. The gaming system server of claim 9, wherein when executed by the at least one processor, the plurality of instructions cause the at least one processor to receive data associated with a placement of a wager on the at least partially concurrently displayed play of the second, different game.

15. The gaming system server of claim 9, wherein when executed by the at least one processor, the plurality of instructions cause the at least one processor to cause the at least one display device to display the at least partially concurrently displayed play of the second, different game in a service window.

16. A method of operating a gaming device, said method comprising:

(a) if a physical item is received via an acceptor, establishing a credit balance based, at least in part, on a monetary value associated with the received physical item, (b) receiving a wager placed on a play of a first game, wherein said credit balance is decreasable based on the wager placed on the play of the first game, (c) for the play of the first game:

(i) causing at least one processor to execute a plurality of instructions to randomly determine a first game outcome, (ii) causing at least one display device to display to a player the randomly determined first game outcome, (iii) causing the at least one processor to execute the plurality of instructions to determine any first game award associated with the randomly determined first game outcome, and (iv) causing the at least one display device to display to the player to the player any determined first game award associated with the randomly determined first game outcome, wherein said credit balance is increasable based on any determined first game award associated with the randomly determined first game outcome, (d) if a game transfer event occurs independent of any displayed event in the play of the first game:

(i) causing the at least one display device to at least partially concurrently display a play of a second, different game of another device, and (ii) causing the at least one display device to display to the player any award associated with the at least partially concurrently displayed play of the second, different game, wherein:

(A) any displayed award associated with the at least partially concurrently displayed play of the second, different game is displayed in addition to any determined first game award associated with the randomly determined first game outcome, and (B) said credit balance is increasable based on any displayed award associated with the at least partially concurrently displayed play of the second, different game, and (e) if a cashout input is received via a cashout device, causing an initiation of any payout associated with the credit balance.

17. The method of claim 16, wherein the other device includes another gaming device.

18. The method of claim 17, wherein the other gaming device is played by another player.

19. The method of claim 18, wherein the other gaming device displays to the other player any award associated with the at least partially concurrently displayed play of the second, different game.

20. The method of claim 16, wherein the other device includes a server.

21. The method of claim 16, wherein the game transfer event randomly occurs independent of any displayed event in the play of the first game.

22. The method of claim 16, which includes receiving a wager on the at least partially concurrently displayed play of the second, different game.

23. The method of claim 16, which includes causing the at least one display device to display the at least partially concurrently displayed play of the second, different game in a service window of the at least one display device.

24. The method of claim 16, which is provided through a data network.

25. The method of claim 24, wherein the data network is an internet.

* * * * *